(12) United States Patent
Bonissone et al.

(10) Patent No.: US 7,756,678 B2
(45) Date of Patent: Jul. 13, 2010

(54) SYSTEM AND METHOD FOR ADVANCED CONDITION MONITORING OF AN ASSET SYSTEM

(75) Inventors: Piero Patrone Bonissone, Schenectady, NY (US); John Erik Hershey, Ballston Lake, NY (US); Robert James Mitchell, Jr., Waterford, NY (US); Rajesh Venkat Subbu, Jr., Clifton Park, NY (US); Avinash Vinayak Taware, Rexford, NY (US); Xiao Hu, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 96 days.

(21) Appl. No.: 12/129,632

(22) Filed: May 29, 2008

(65) Prior Publication Data

US 2009/0300417 A1 Dec. 3, 2009

(51) Int. Cl.
*G06F 11/28* (2006.01)
(52) U.S. Cl. .............. 702/182; 702/122; 702/183; 702/184; 702/185; 702/190; 700/28; 700/29; 700/108; 700/109; 700/110; 714/26; 714/47; 714/E11.178
(58) Field of Classification Search ........... 702/182, 702/183, 56, 190, 122, 187, 185, 184; 700/26, 700/28–31, 48–50, 109, 104, 110, 108; 706/6, 706/15, 23; 714/37, 46–48, 26
See application file for complete search history.

(56) References Cited

U.S. PATENT DOCUMENTS

| | | | |
|---|---|---|---|
| 4,800,512 A | 1/1989 | Busch | |
| 5,005,142 A * | 4/1991 | Lipchak et al. | 702/183 |
| 5,251,151 A | 10/1993 | Demjanenko et al. | |
| 5,523,701 A | 6/1996 | Smith et al. | |
| 5,778,152 A * | 7/1998 | Oki et al. | 706/25 |
| 5,870,699 A | 2/1999 | Canada et al. | |
| 6,078,874 A | 6/2000 | Piety et al. | |
| 6,539,343 B2 * | 3/2003 | Zhao et al. | 702/190 |
| 6,907,383 B2 * | 6/2005 | Eryurek et al. | 702/183 |
| 7,181,334 B2 * | 2/2007 | Kropinski et al. | 701/106 |
| 7,324,919 B2 | 1/2008 | Lindberg et al. | |
| 2001/0001136 A1 | 5/2001 | Aronsson | |
| 2003/0130811 A1 | 7/2003 | Boerhout | |
| 2006/0074558 A1 * | 4/2006 | Williamson et al. | 701/213 |
| 2007/0198219 A1 | 8/2007 | Havela et al. | |
| 2009/0037772 A1 * | 2/2009 | Wegerich et al. | 714/26 |

FOREIGN PATENT DOCUMENTS

| | | |
|---|---|---|
| WO | 2007008940 A2 | 1/2007 |
| WO | 2007052949 A1 | 5/2007 |
| WO | 2007064860 A1 | 6/2007 |

* cited by examiner

*Primary Examiner*—Carol S Tsai
(74) *Attorney, Agent, or Firm*—Ann M. Agosti

(57) ABSTRACT

A method for advanced condition monitoring of an asset system includes using a plurality of auto-associative neural networks to determine estimates of actual values sensed by at least one sensor in at least one of the plurality of operating regimes; determining a residual between the estimated sensed values and the actual values sensed by the at least one sensor from each of the plurality of auto-associative neural networks; and combining the residuals by using a fuzzy supervisory model blender; performing a fault diagnostic on the combined residuals; and determining a change of the operation of the asset system by analysis of the combined residuals. An alert is provided if necessary. A smart sensor system includes an on-board processing unit for performing the method of the invention.

16 Claims, 34 Drawing Sheets

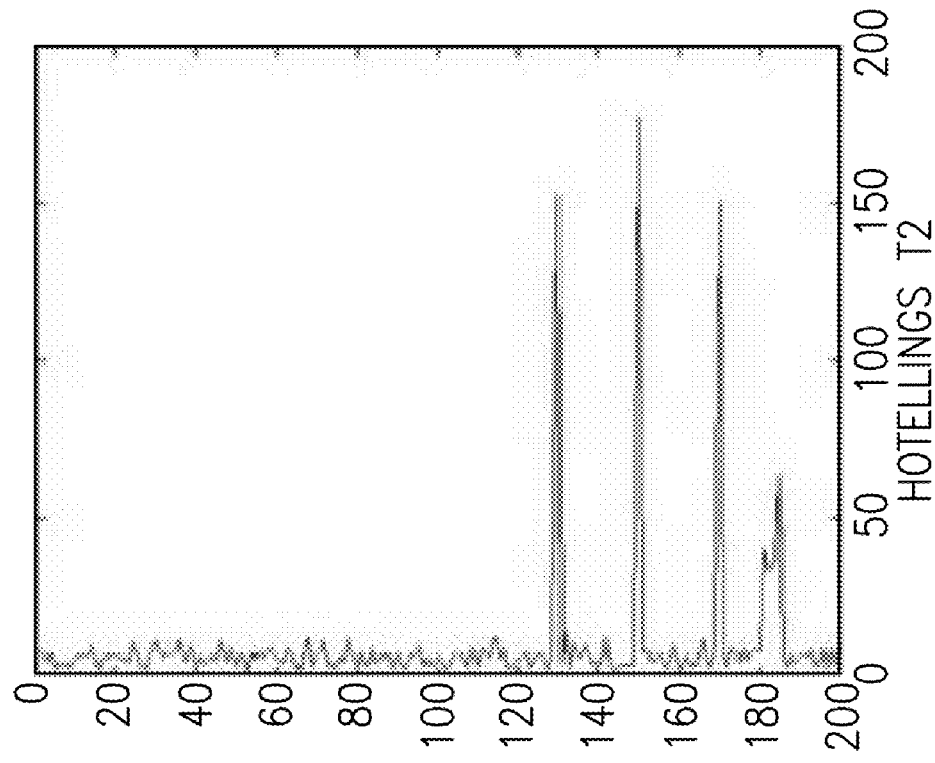
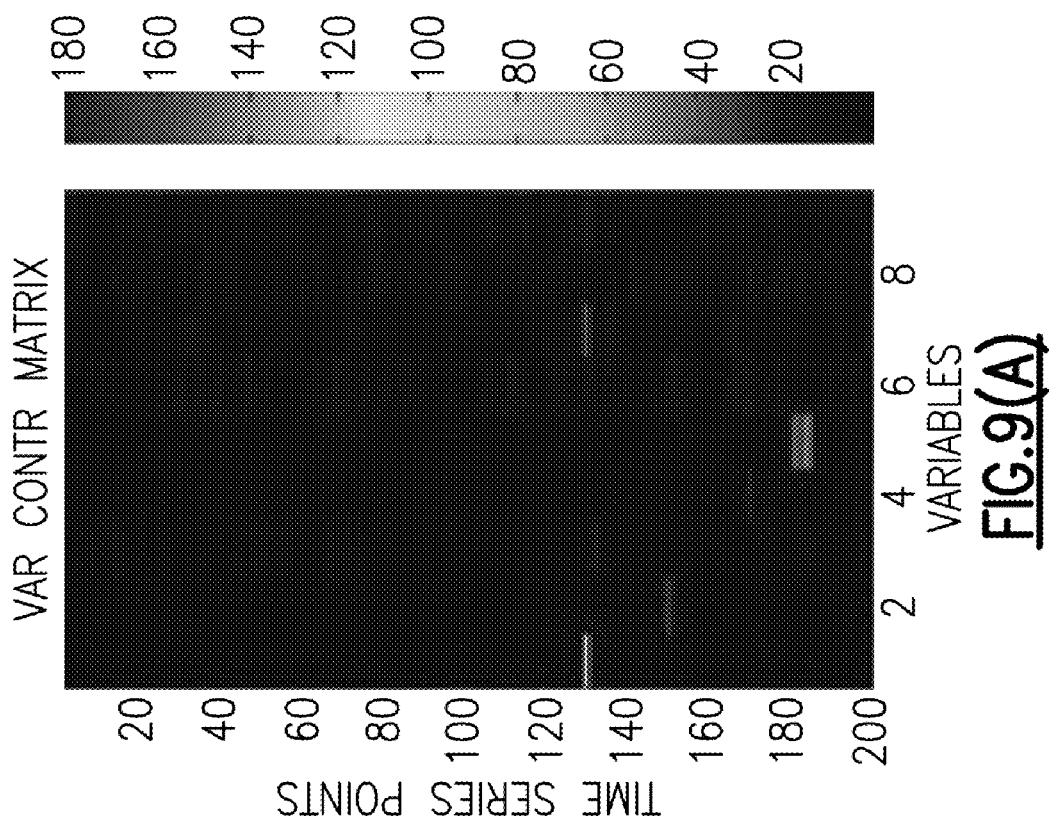
FIG.9(A)
FIG.9(B)

SYSTEM AND METHOD FOR ADVANCED CONDITION MONITORING OF AN ASSET SYSTEM

BACKGROUND

The invention relates generally to Condition Based Maintenance (CBM), and in particular to advanced condition monitoring of assets using smart sensors to improve asset maintenance agility and responsiveness, increase operational availability of the asset, and reduce life-cycle total ownership costs of the asset.

There are billions of dollars invested in fixed-plant equipment performing vital and time-critical functions supporting industrial and infrastructure activities. It is essential that degradation in these equipment be expeditiously identified in order to isolate or repair the ailing equipment before they fail and severely impact the efficiency of the system of which they are a part or, even more seriously, cause physical damage that is spread significantly beyond the failed equipment.

Maintenance has evolved over the years from purely reacting to equipment breakdowns (corrective maintenance), to performing time-based preventive maintenance, to today's emphasis on the need to perform maintenance based on the condition of the system/asset (condition based maintenance). Anomaly detection is a critical task in equipment monitoring, fault diagnostics and system prognostics. It involves monitoring changes to the system state to detect faulty behavior. Early detection of anomalies will allow for timely maintenance actions to be taken before a potential fault progresses, causing secondary damage and equipment downtime. Prior approaches for anomaly detection commonly utilize univariate techniques to detect changes in the measurement of individual sensors. However, typically a system's state is characterized by the interactions and inter-relationships between the various sensor measurements considered together.

There is a growing need for Condition Based Maintenance (CBM) to improve maintenance agility and responsiveness, increase operational availability, and reduce life-cycle total ownership costs.

BRIEF DESCRIPTION

Briefly, a method for advanced condition monitoring of an asset system comprises the steps of:

segmenting an operating space of an asset system into a plurality of operating regimes;

using a plurality of auto-associative neural networks (AANNs) to determine estimates of actual values sensed by the at least one sensor in at least one of the plurality of operating regimes;

determining a residual between the estimated sensed values and the actual values sensed by the at least one sensor from each of the plurality of auto-associative neural networks; and combining the residuals by using a fuzzy supervisory model blender;

performing a fault diagnostic on the combined residuals;

determining a change of the operation of the asset system by analysis of the combined residuals; and providing an alert if a change of the operation of the asset system has been determined.

In yet another aspect of the invention, a smart sensor system comprises a smart sensor for monitoring an operating condition of an asset system, the smart sensor being connected to an input port via a cable; and an on-board processing unit for advanced condition monitoring of the asset system using the method recited above.

DRAWINGS

These and other features, aspects, and advantages of the present invention will become better understood when the following detailed description is read with reference to the accompanying drawings in which like characters represent like parts throughout the drawings, wherein.

Figure 3A:
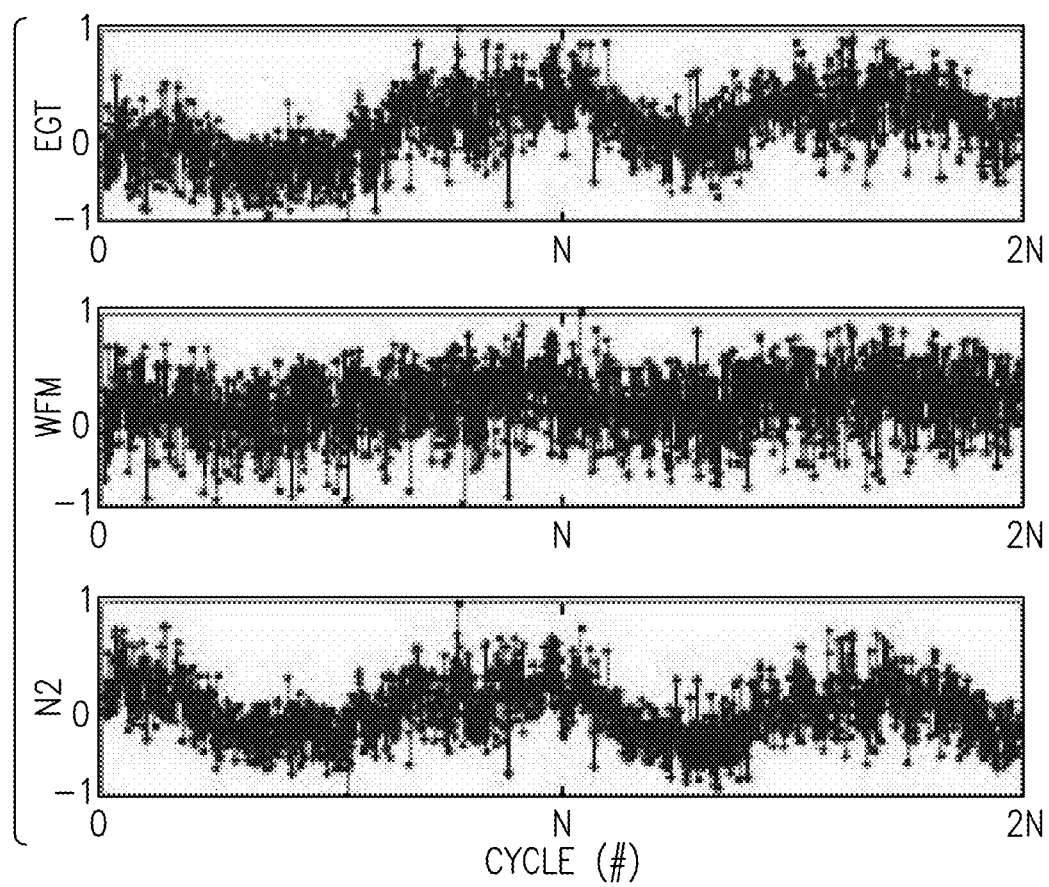
FIG. 3A is a graph of a normalized time-series of sensor data from a turbofan engine—overhauled at the end of the series.
Figure 3B:
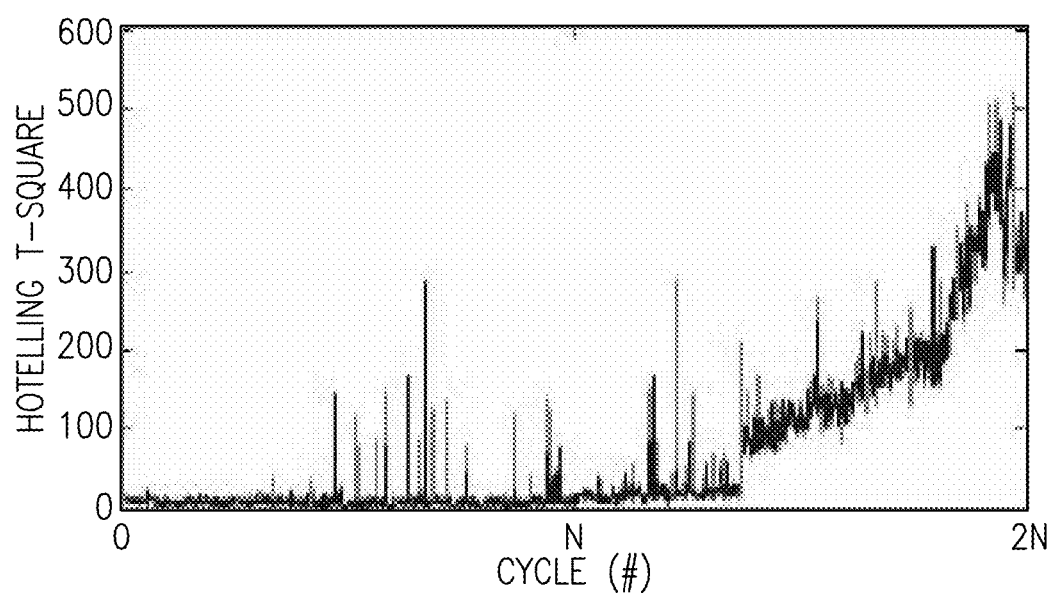

FIG. 3B presents the output of the calculation of a Hotelling's $T^2$ Statistic for change detection applied on the normalized time-series of FIG. 3A.

Figure 4:
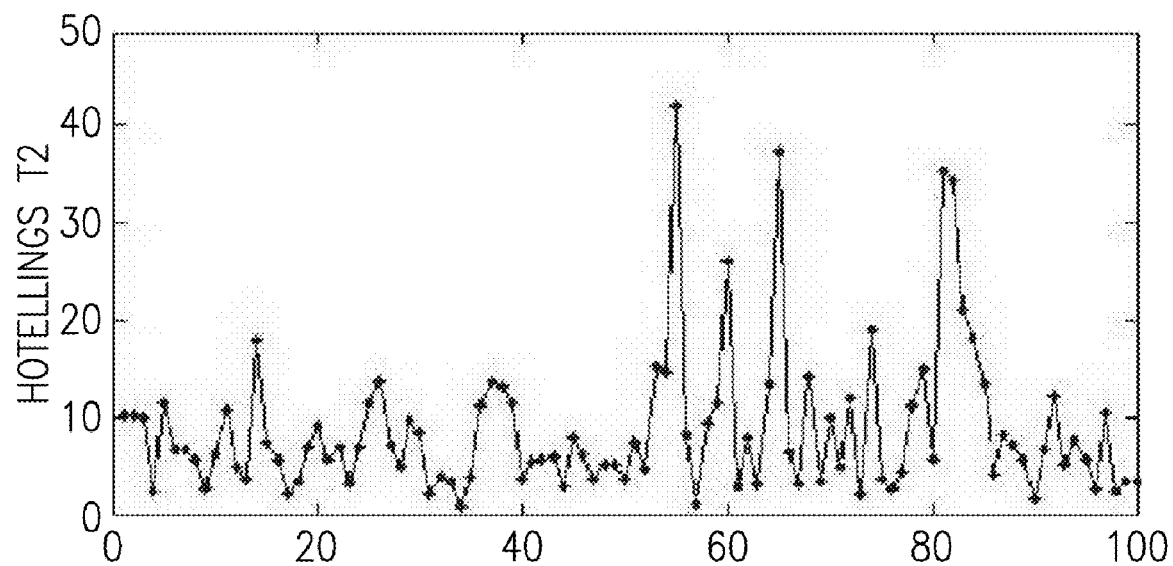
Figure 4:
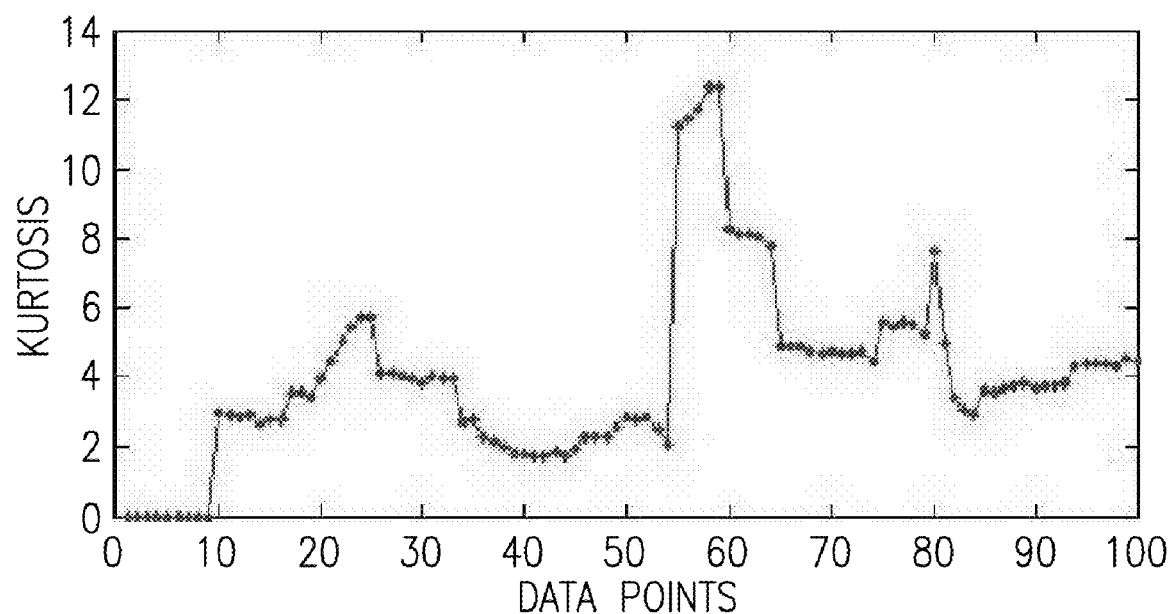

FIG. 4 illustrates the use of the kurtosis to identify departure from normal.

Figure 5:
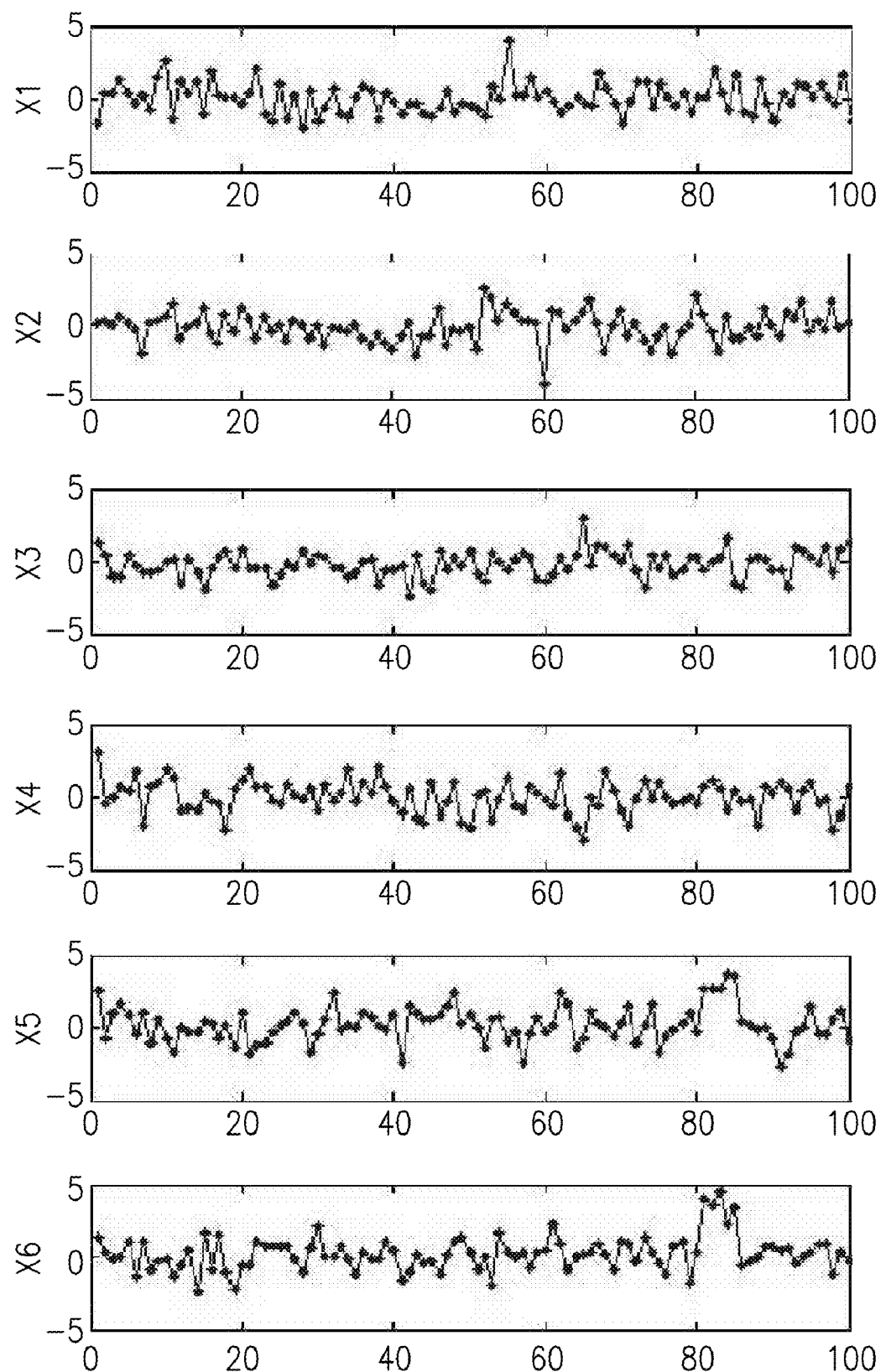

FIG. 5 illustrates simulated data for 6 system monitors.

Figure 6:
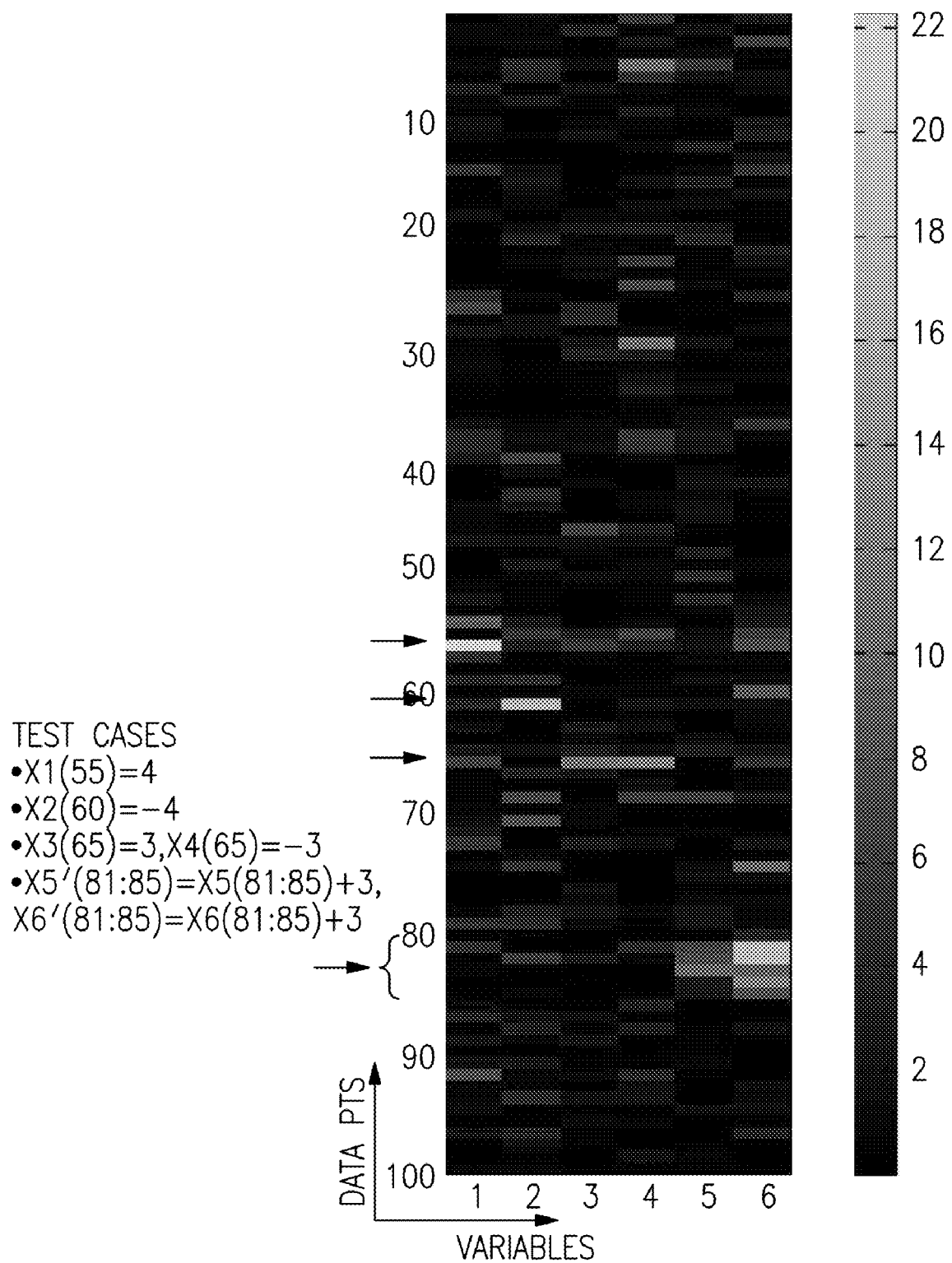

FIG. 6 displays individual variable contributions to Hotelling's $T^2$ using a color-coded map.

Figure 7:
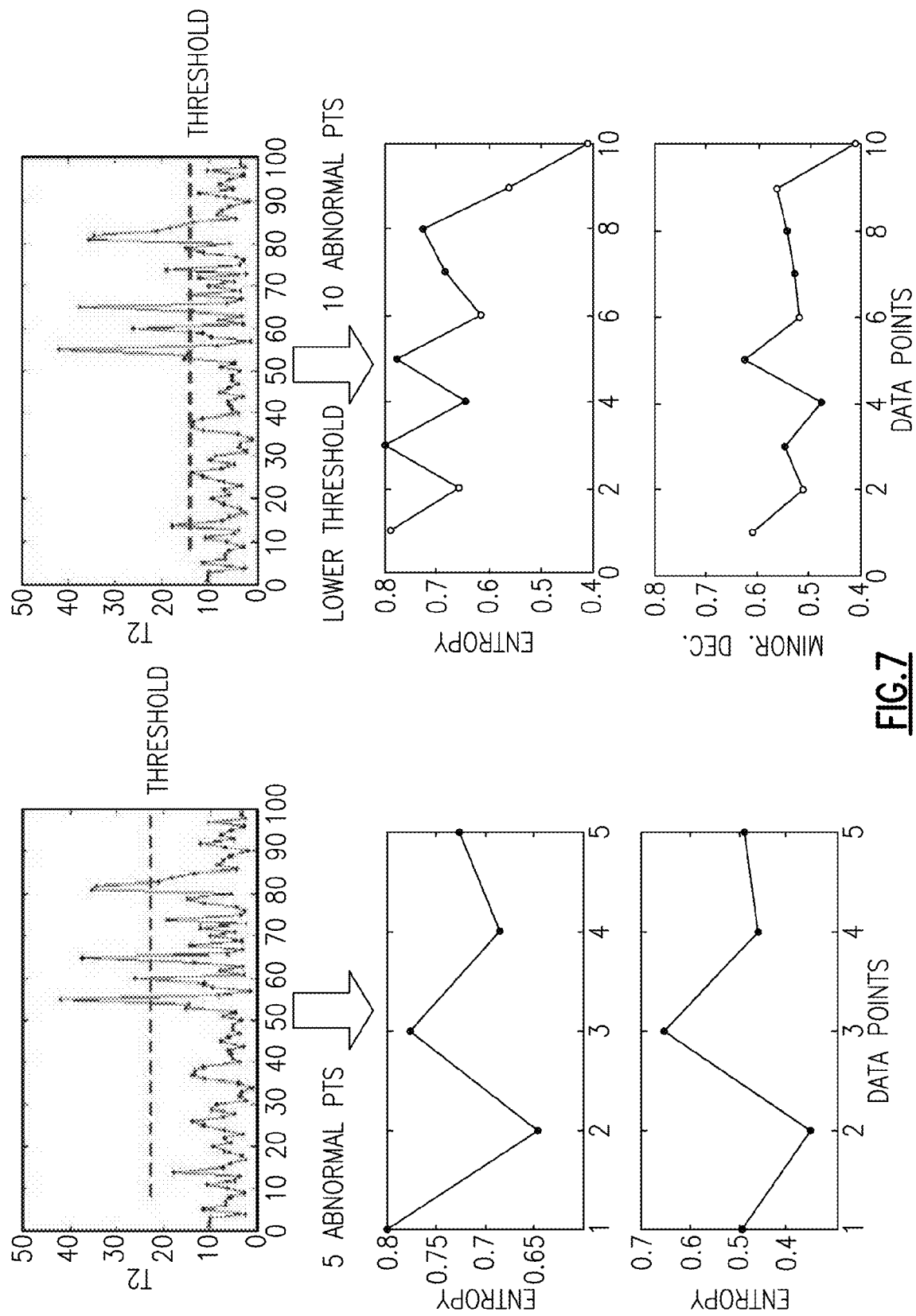

FIG. 7 shows outlier identification using entropy and minority-decision measures.

Figure 8A:
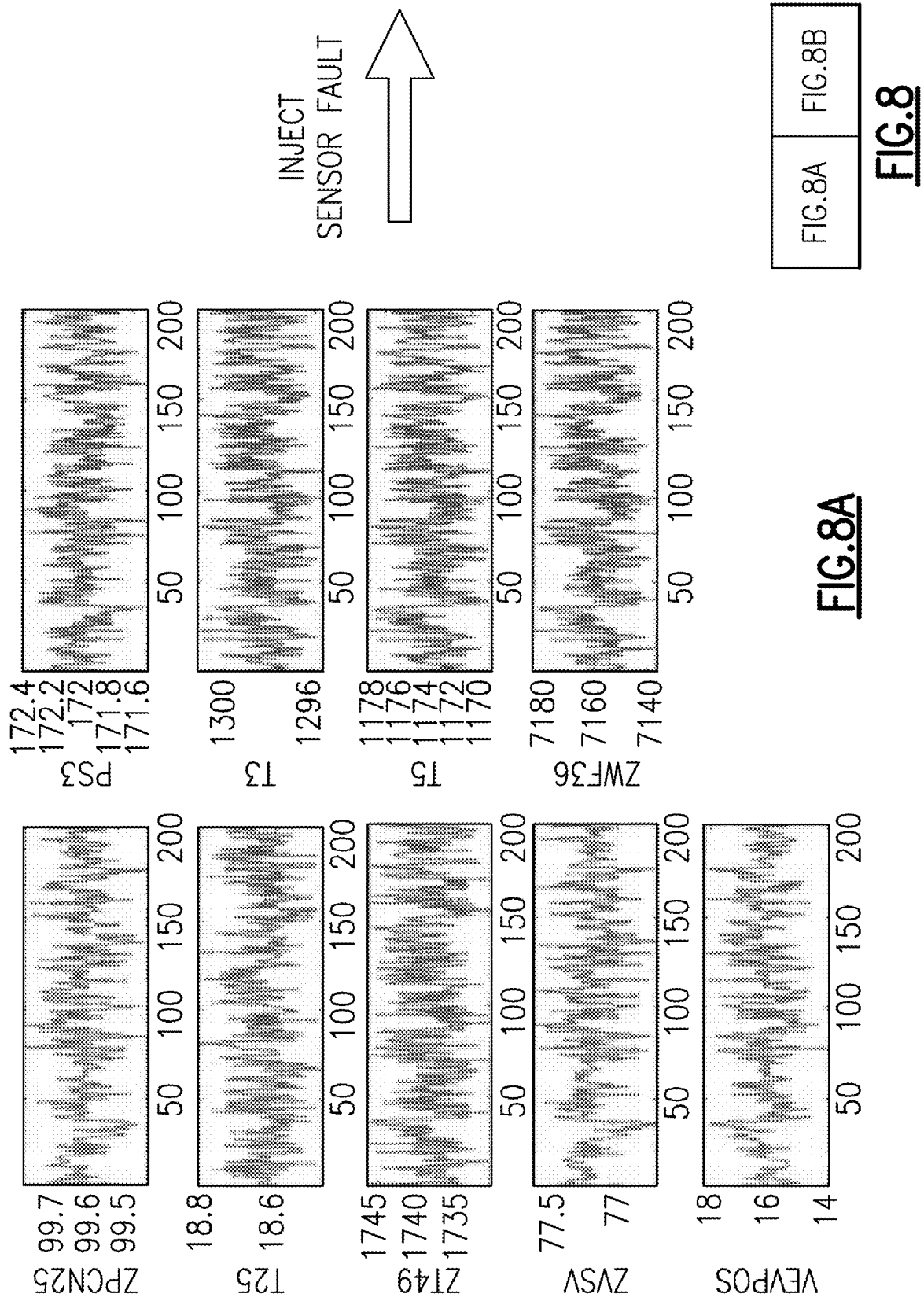
Figure 8B:
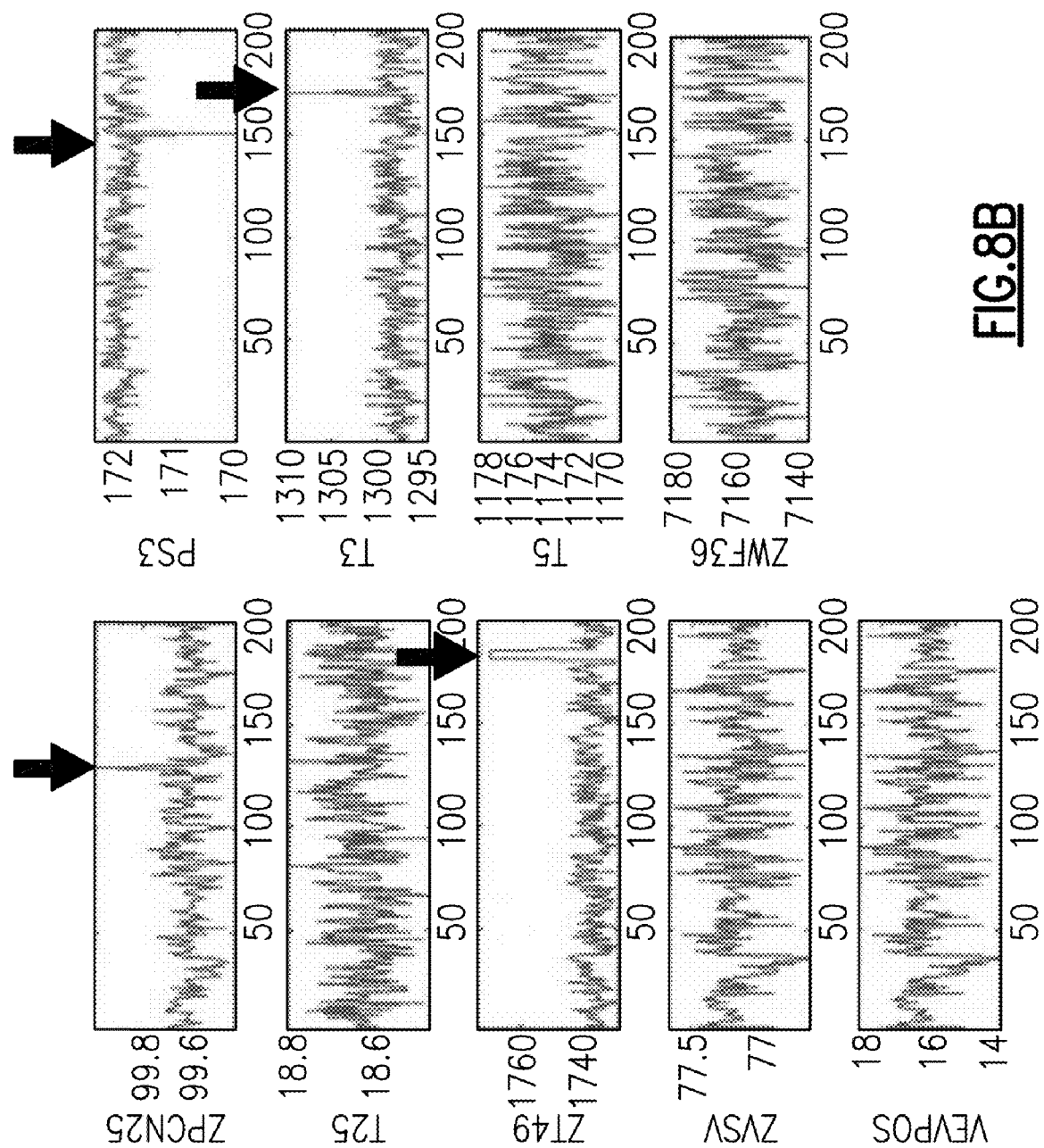

FIG. 8 are graphs of data generation for sensor fault in which normal sensor measurements are displayed in the left graphs and then individual sensor fault (reading offset) are injected where the red arrows indicate in the right graphs.

FIG. 9(A) is a display of a variable contribution matrix where highlighted spots indicates sensors responsible for the high $T^2$ score.

FIG. 9(B) is a graph of Hotelling's $T^2$ statistic where the peaked $T^2$ values indicate anomalies in the sensor readings.

Figure 10:
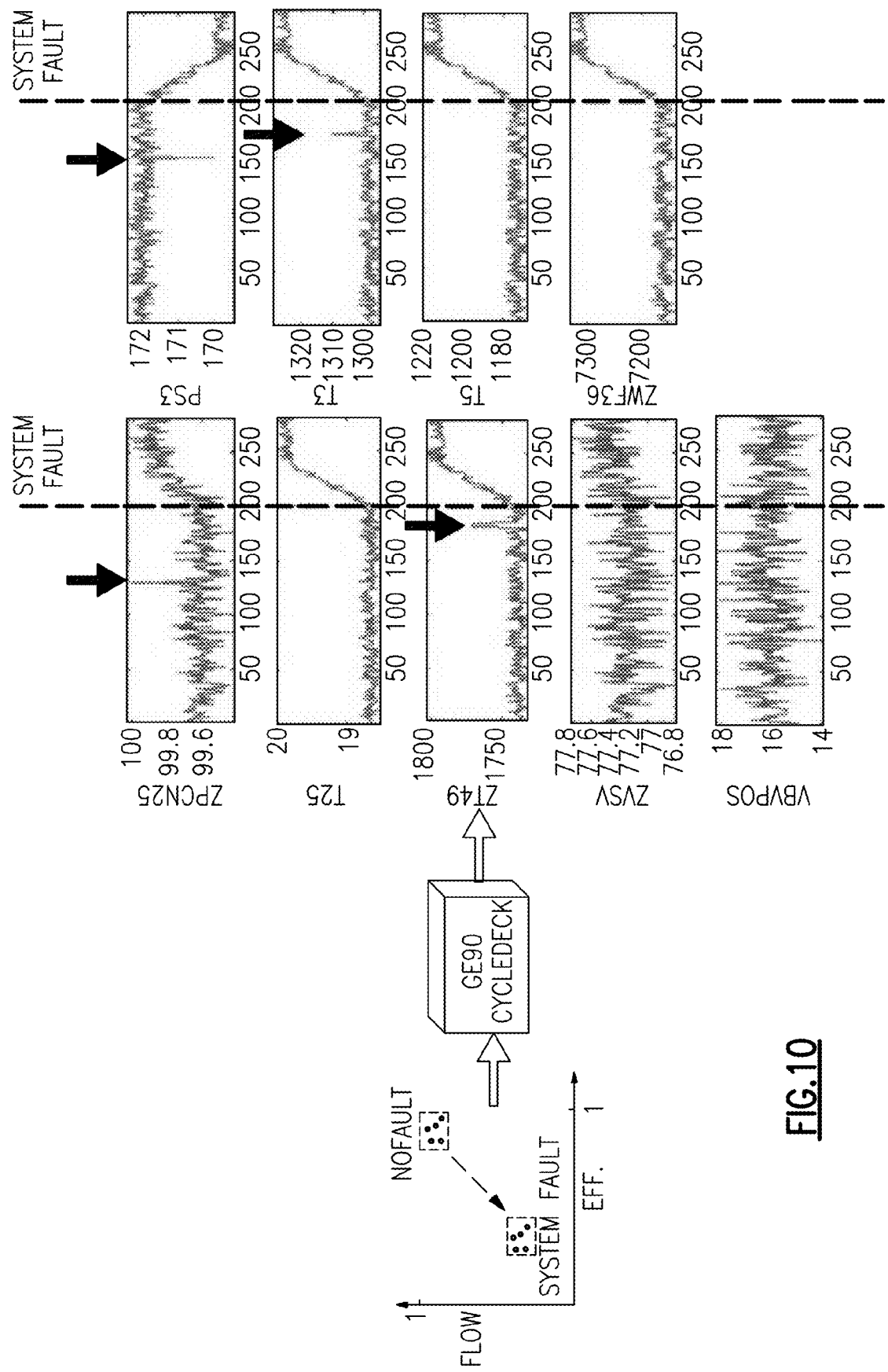

FIG. 10 shows data generation for system fault in which the data points after the dashed line are generated under system fault.

Figures 11, 12:
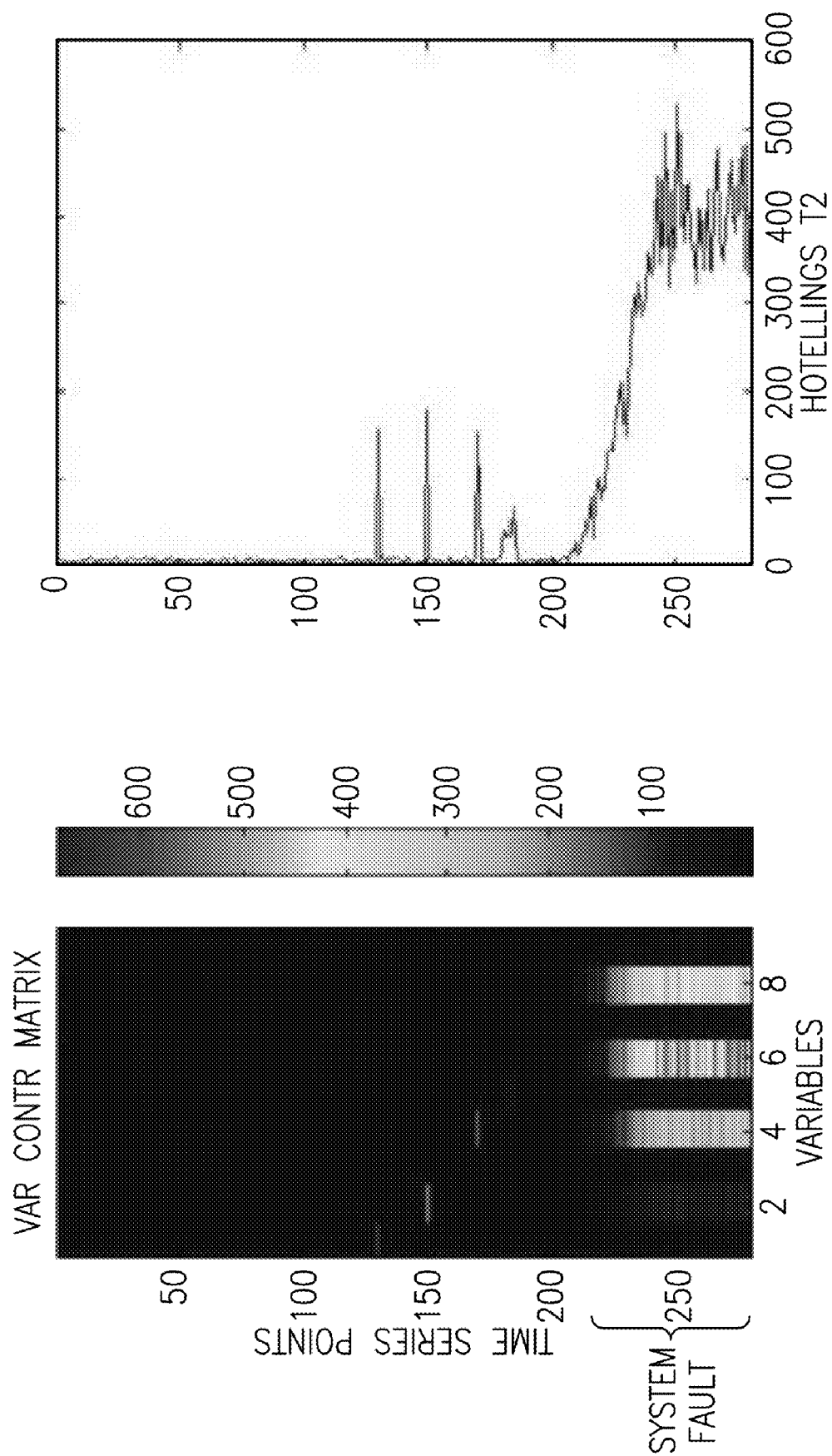

FIG. 11 is a display of a variable contribution matrix, where highlighted spots indicates sensors responsible for the high $T^2$ score.

FIG. 12 is a graph of Hotelling's $T^2$ statistic where the high $T^2$ values indicate anomalies in the sensor measurement.

Figure 13:
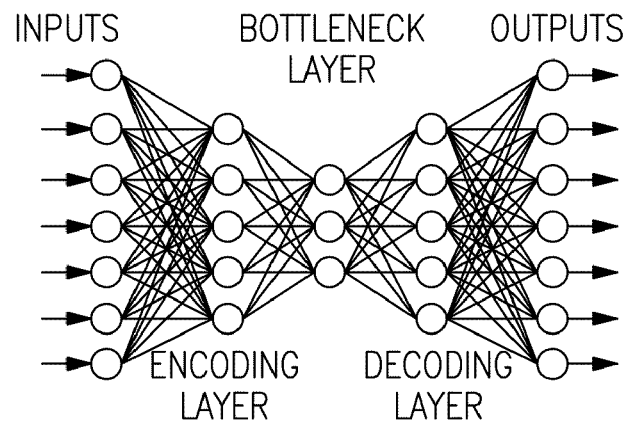

FIG. 13 is a diagram of the architecture of a 7-5-3-5-7 Auto Associative Neural Network (AANN).

Figure 14:
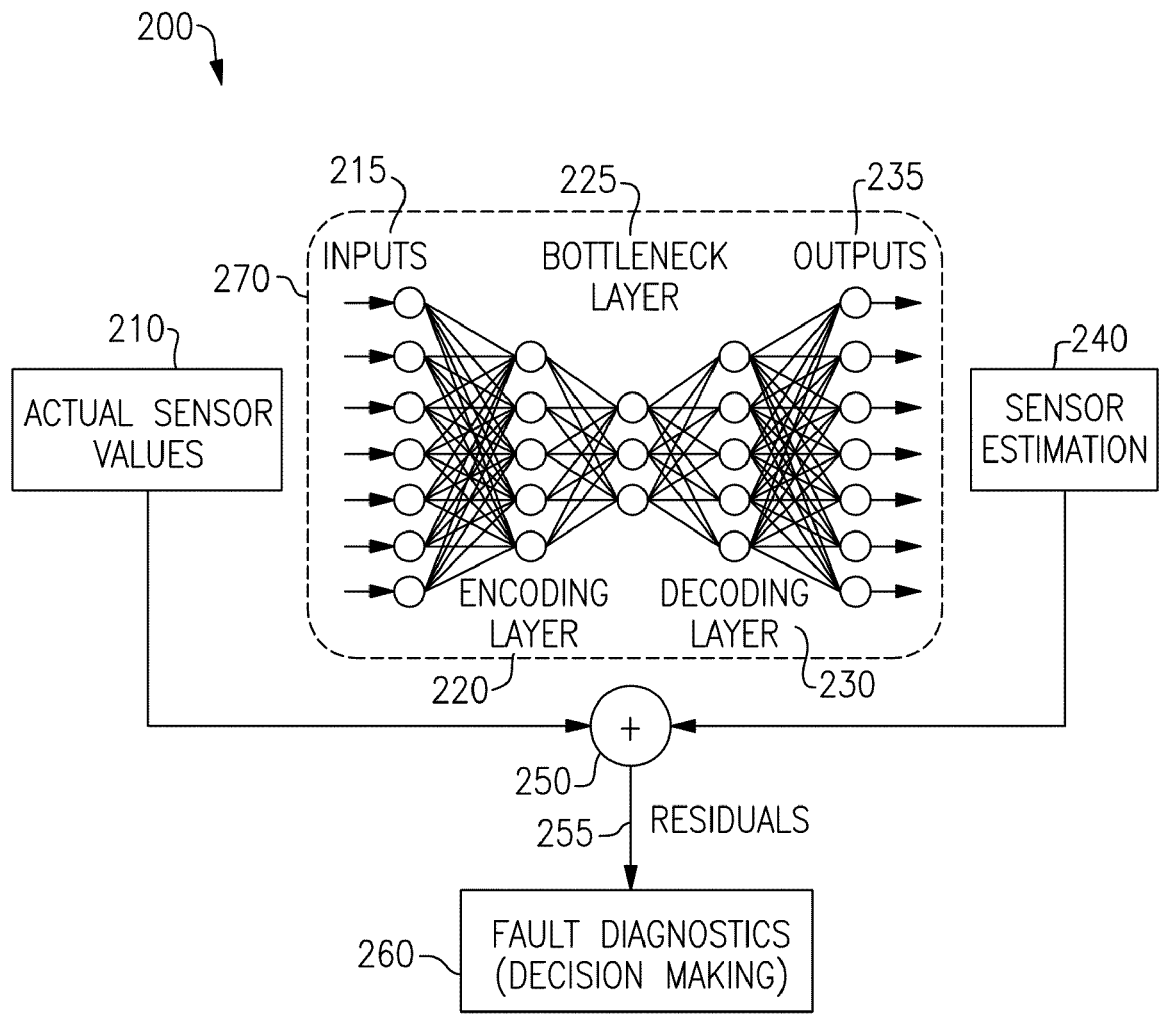

FIG. 14 is a diagram of an anomaly detection paradigm using AANN.

Figure 15A:
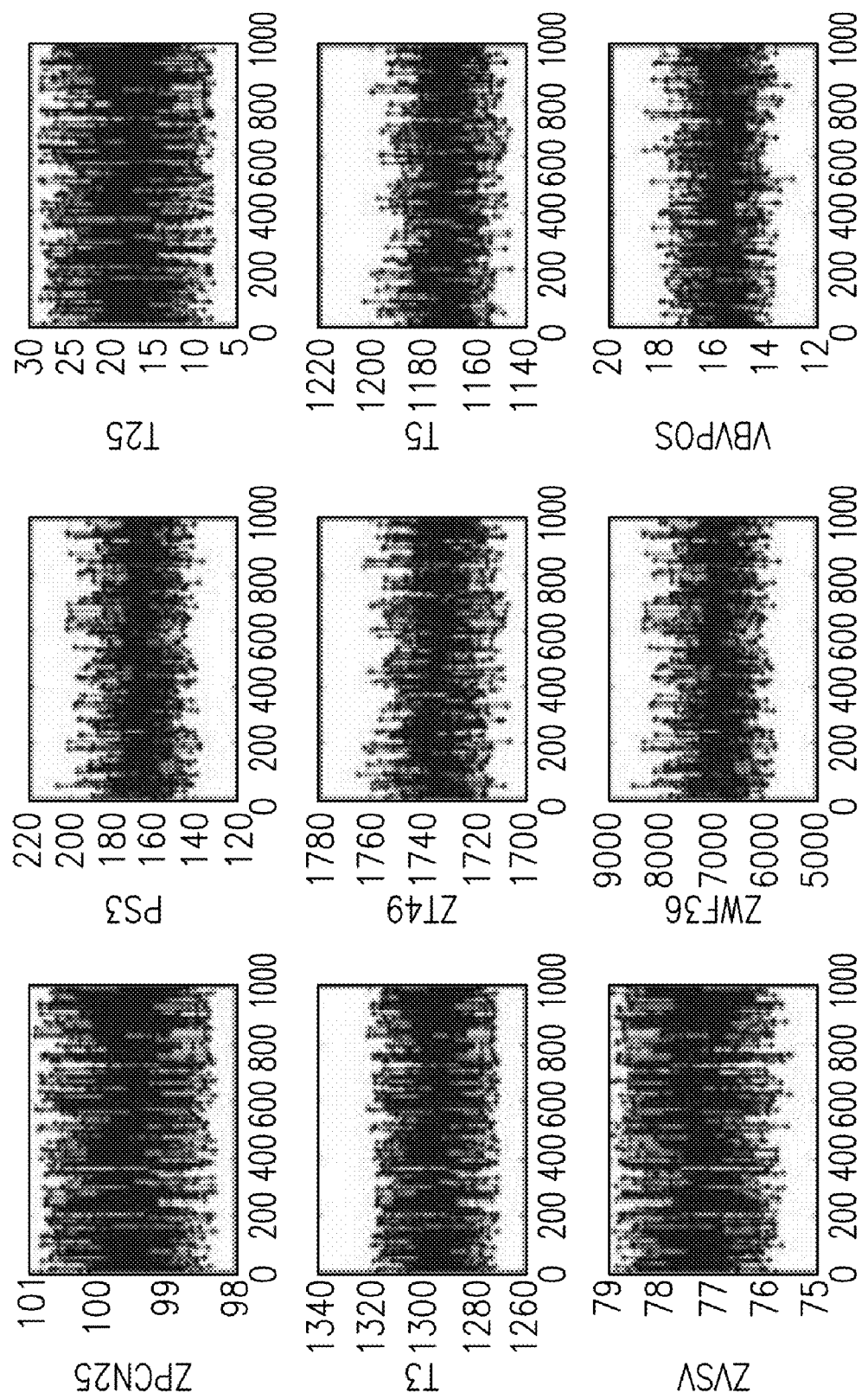

FIG. 15(A) are displays of a sample of typical raw sensor measurements, $X1(t), \ldots, X9(t)$.

Figure 15B:
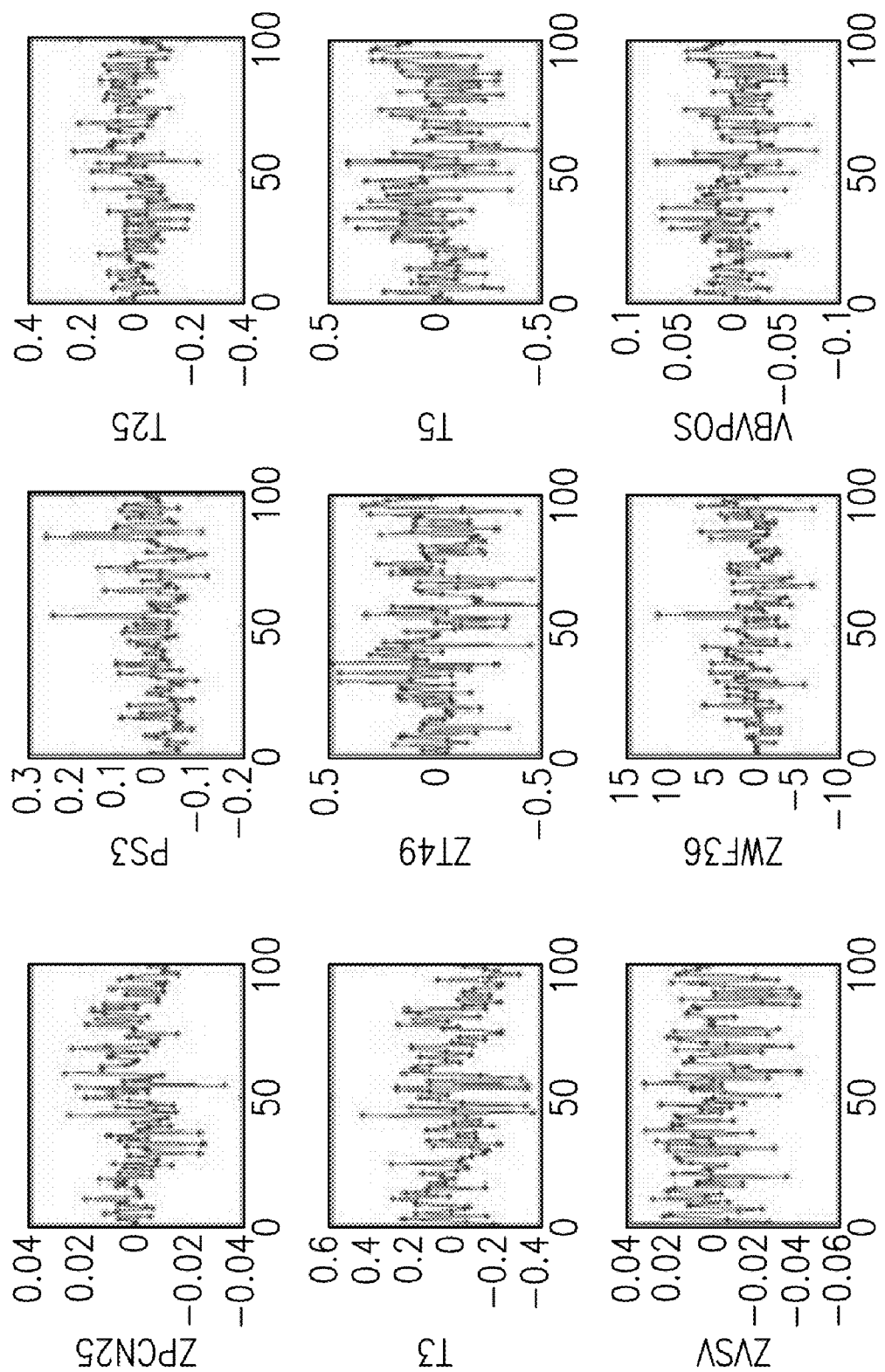

FIG. 15(B) is are graphs of residual values, $R1(t), \ldots, R9(t)$ corresponding to the raw sensor measurements, $X1(t), \ldots, X9(t)$, of FIG. 15(A).

Figure 16:
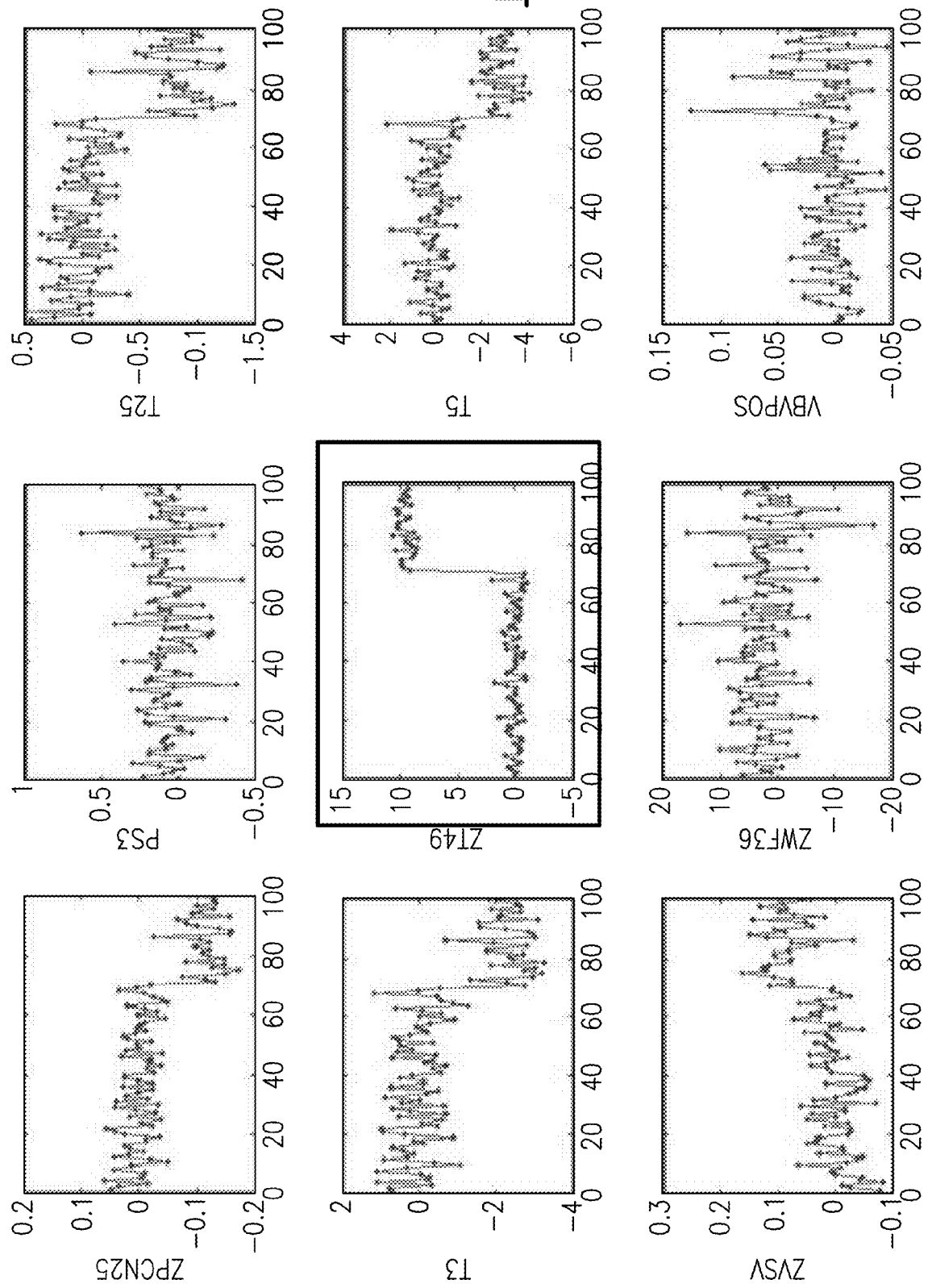

FIG. 16 shows residual values after injecting a large step function in the sensor data measuring the fifth variable.

Figure 17:
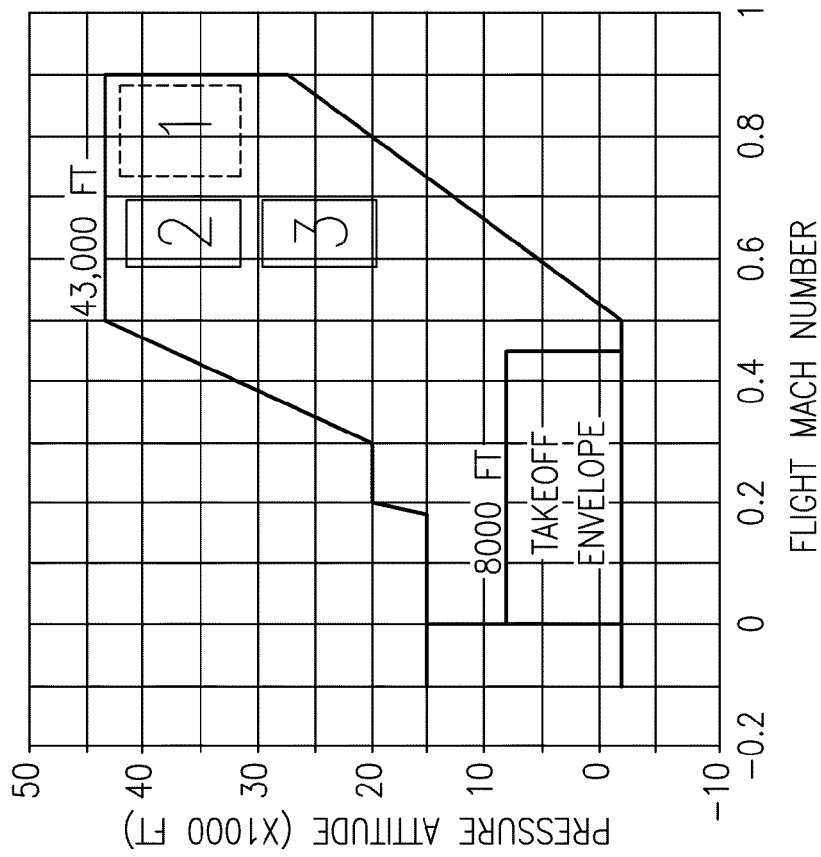
Figure 17:
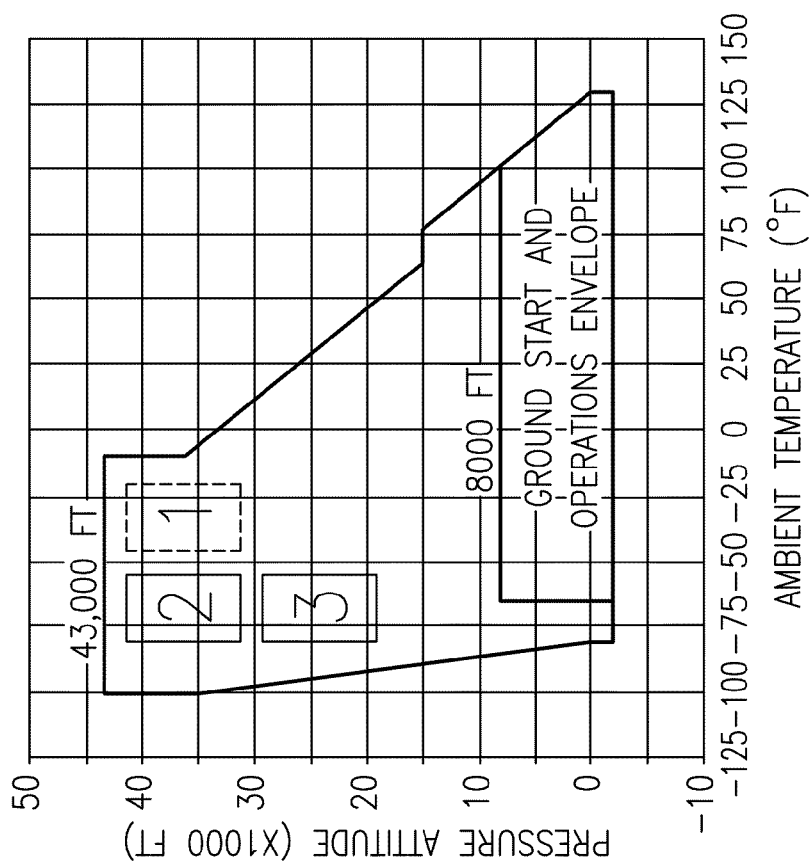

FIG. 17 is an illustration of different operating regime using flight envelopes.

Figure 18A:
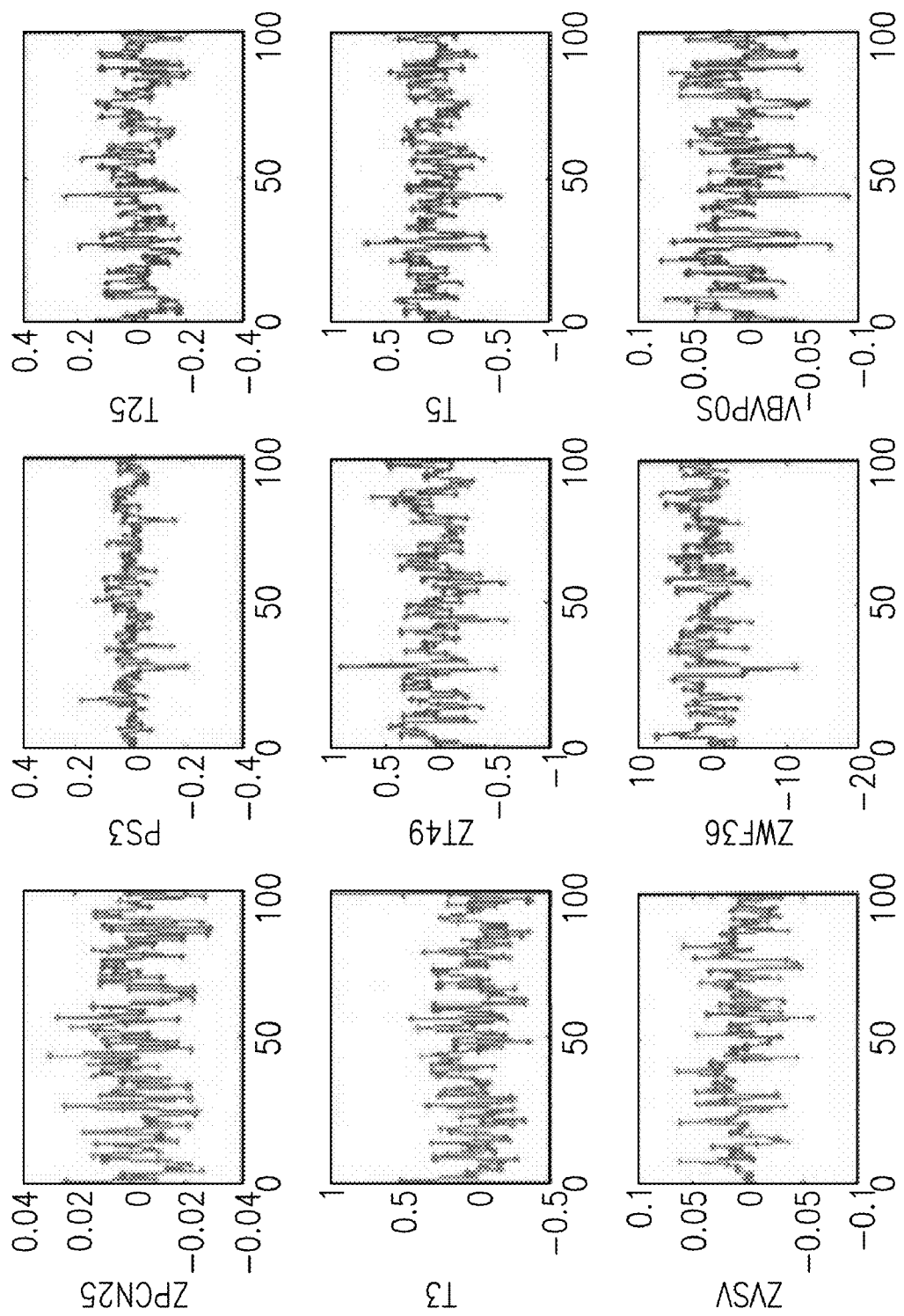
Figure 18B:
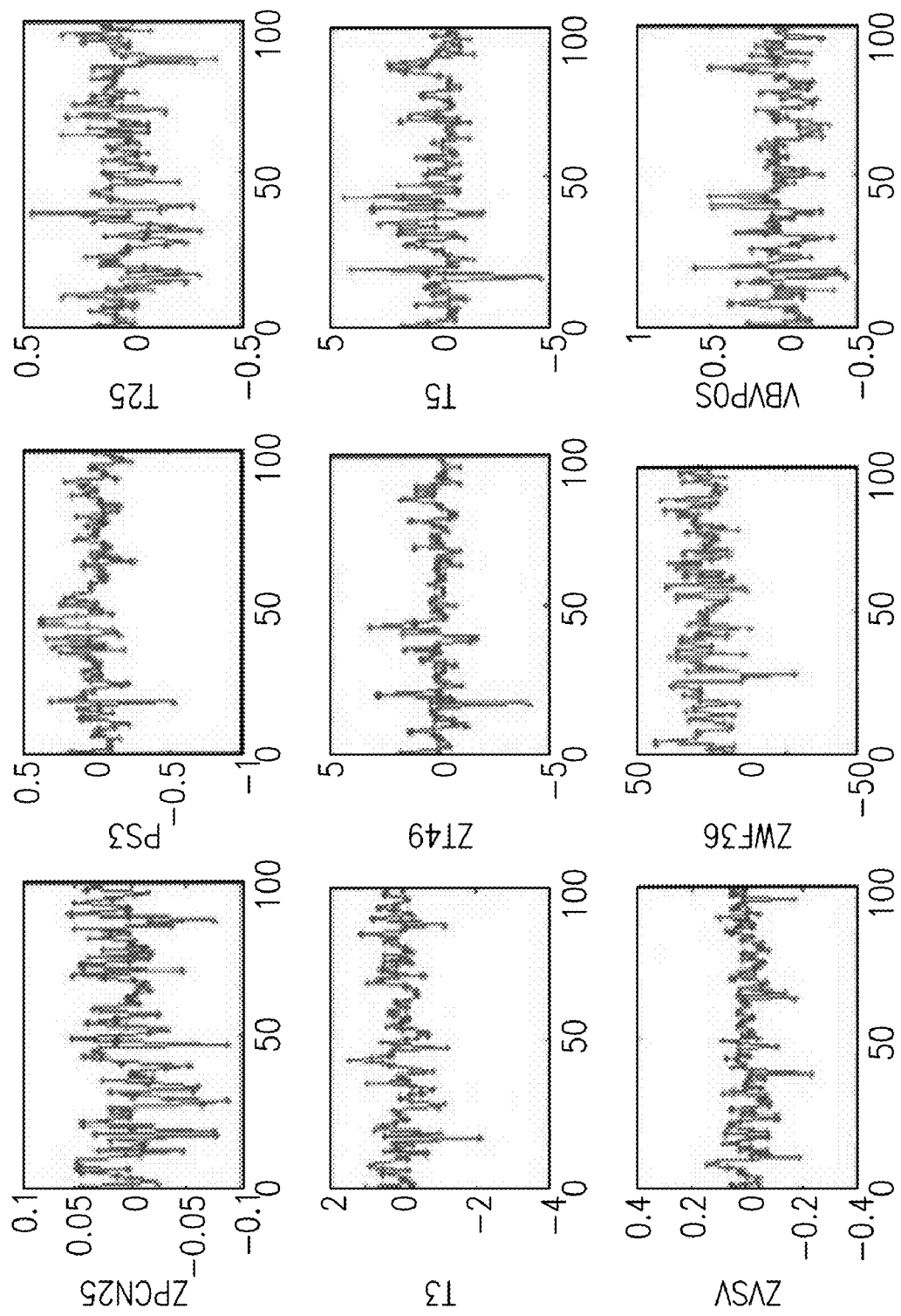
Figure 18C:
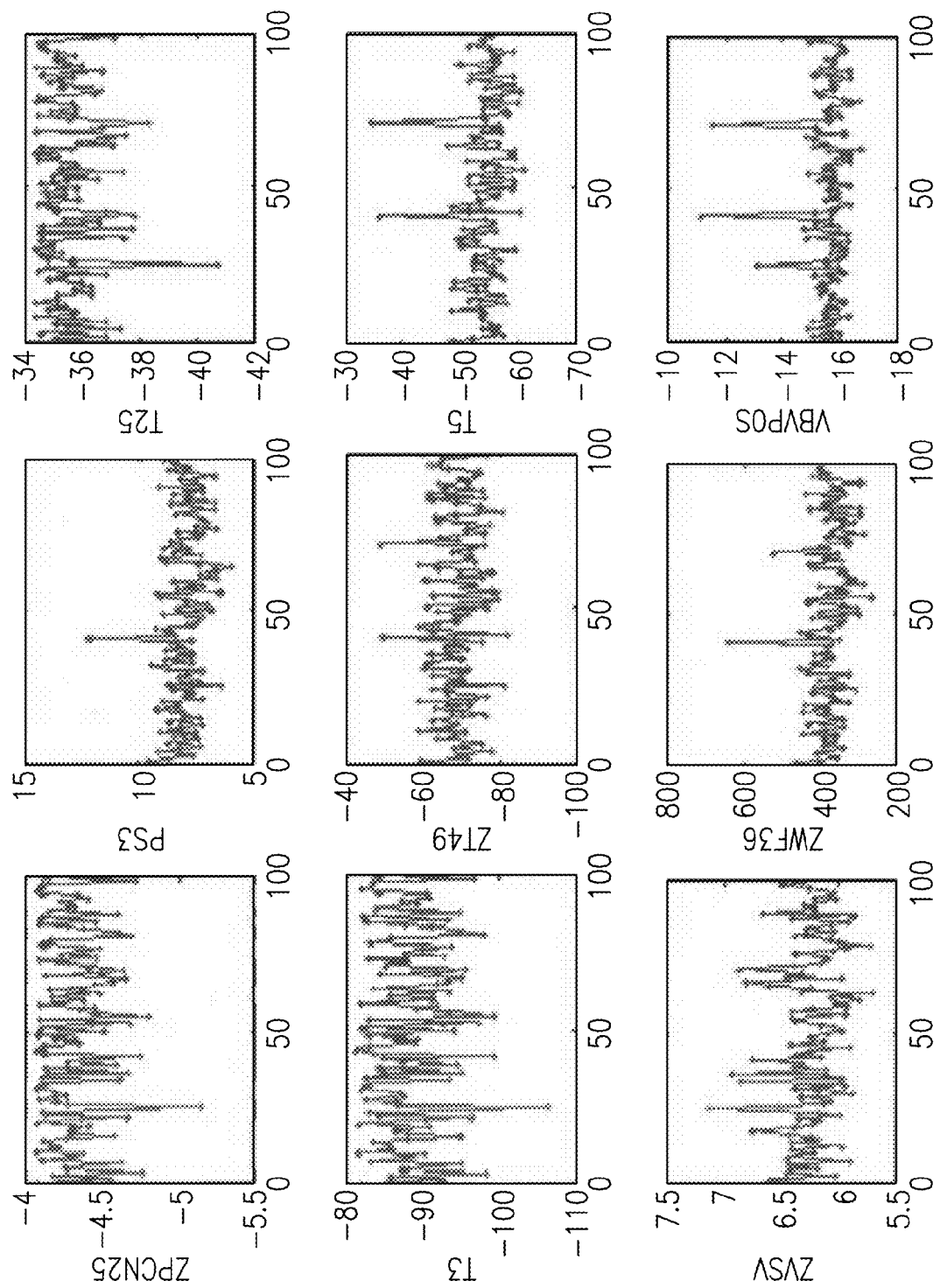

FIGS. 18(a)-(c) show residuals of different AANN models on the test sets from different operating regimes.

Figure 19A:
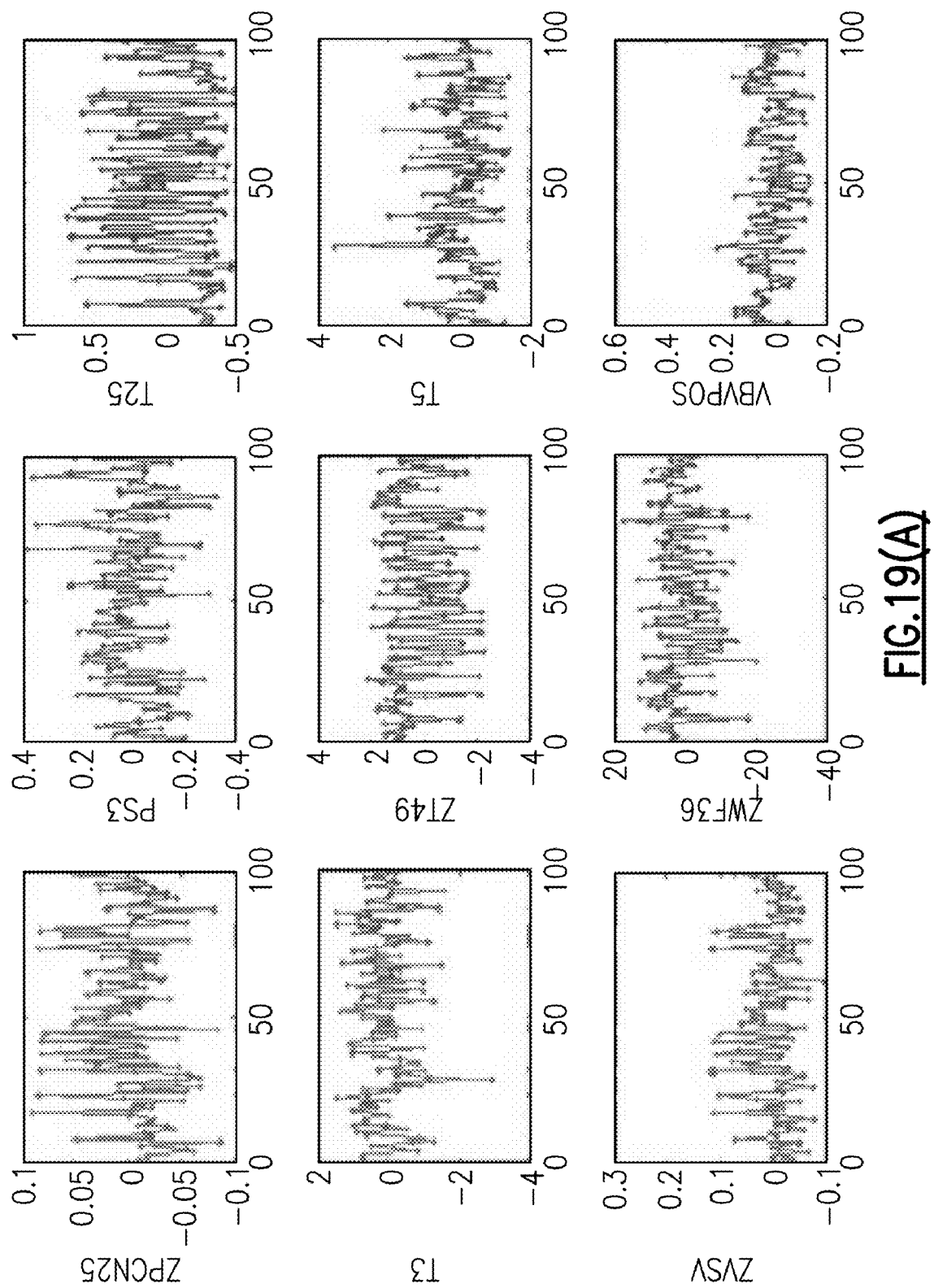
Figure 19B:
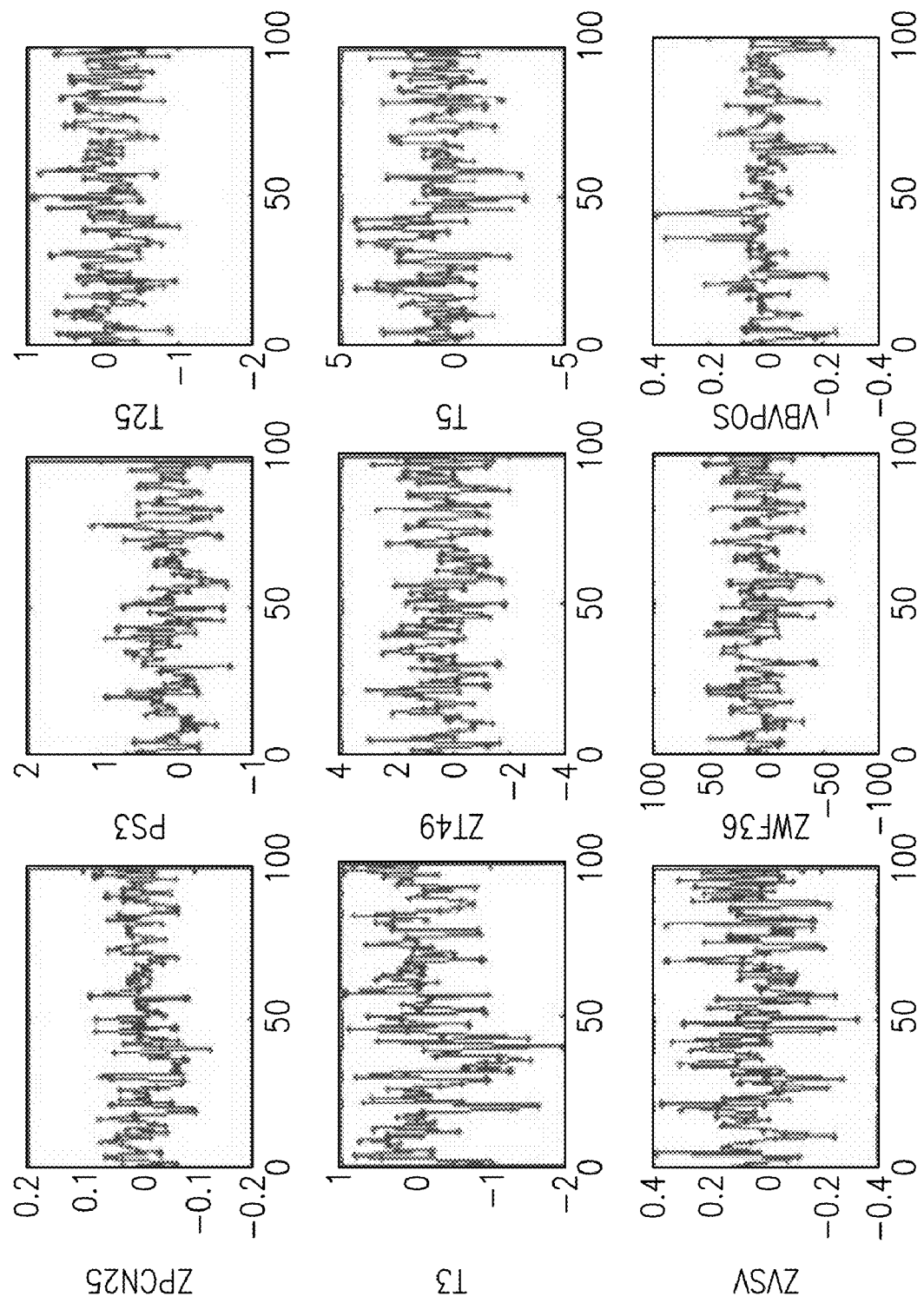
Figure 19C:
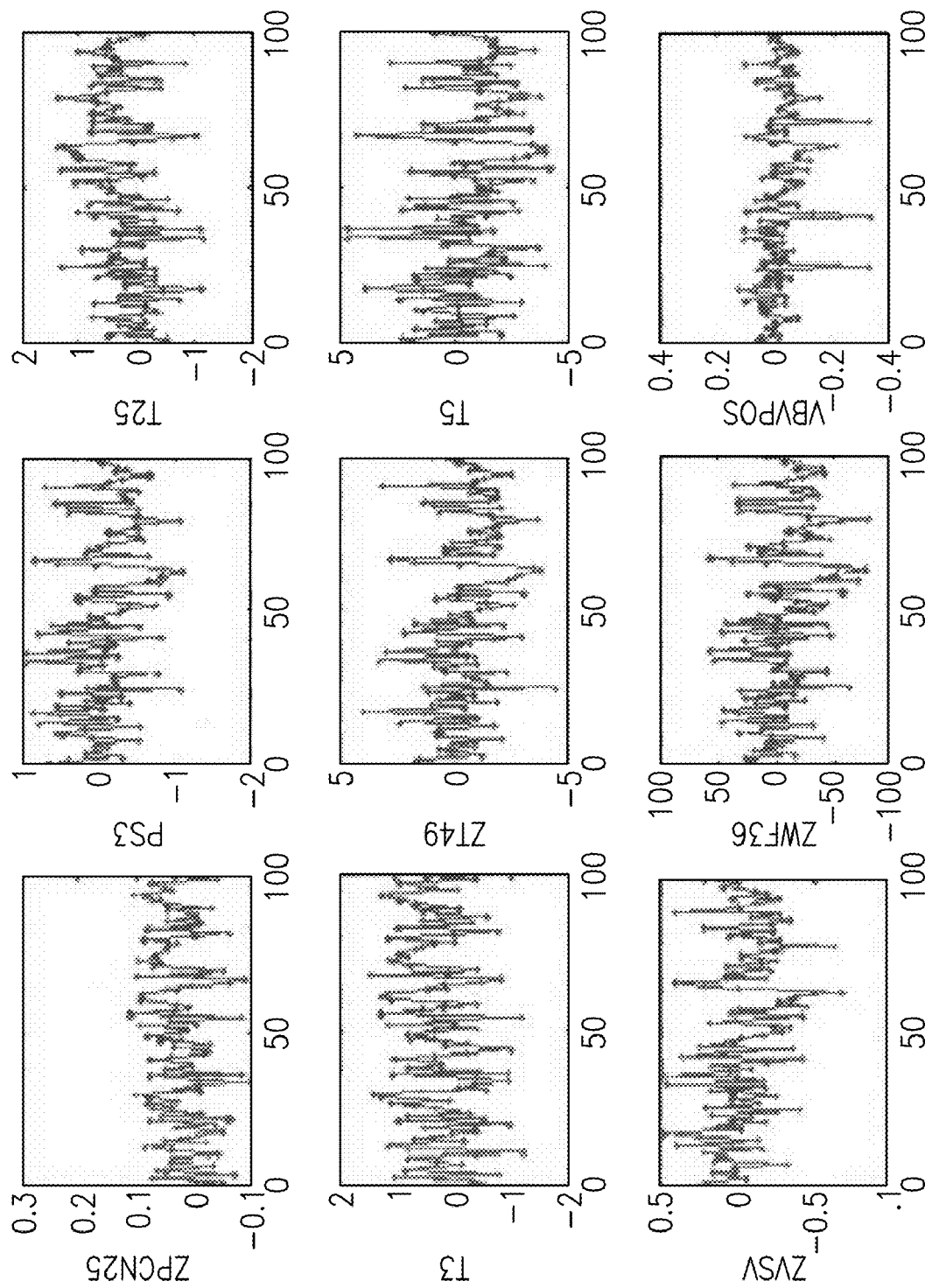

FIGS. 19(a)-(c) shows residuals of a global AANN model on the testsets from different operating regimes.

Figure 20A:
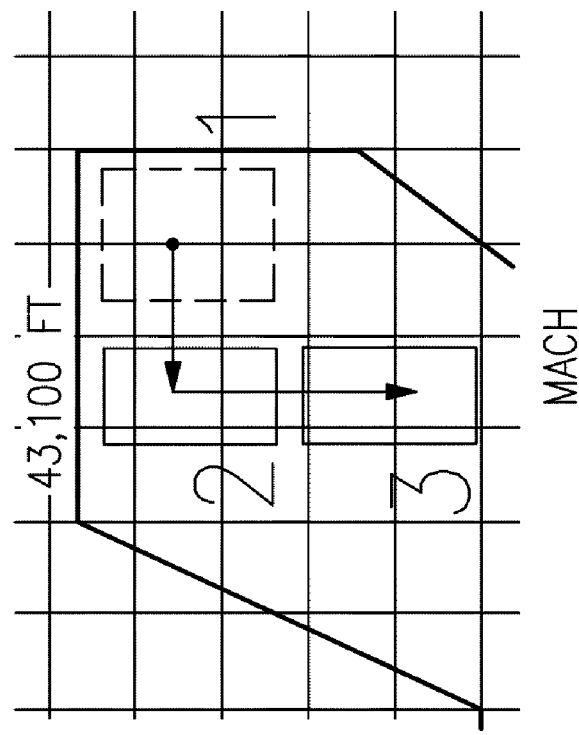
Figure 20A:
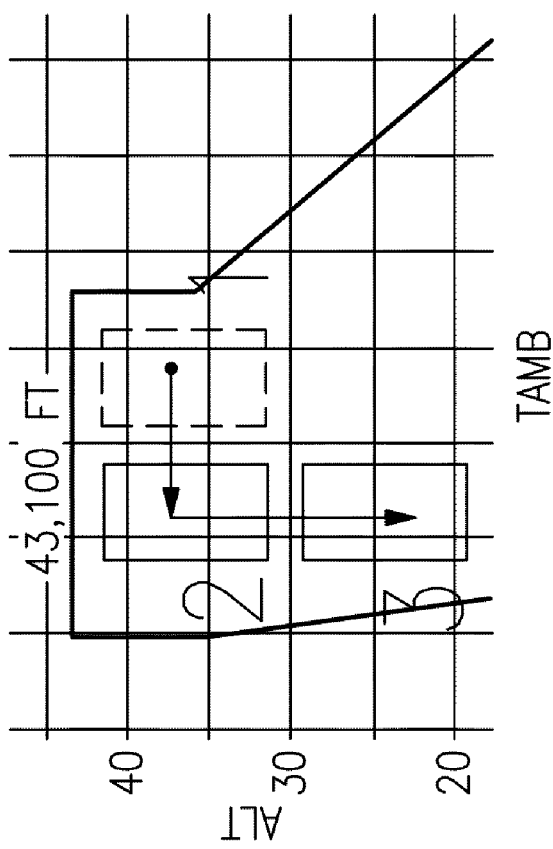
Figure 20B:
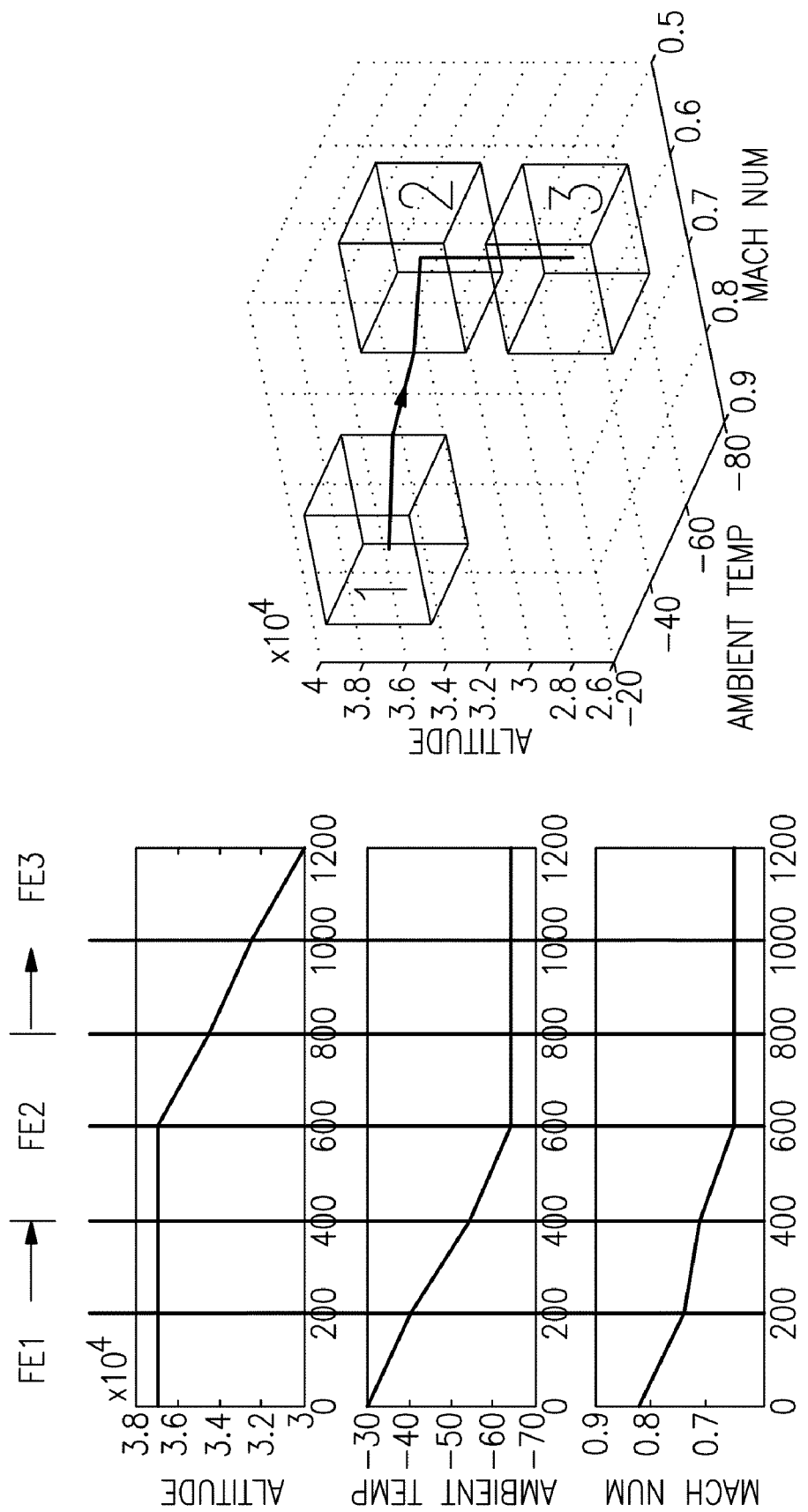

FIGS. 20(a) and 20(b) are illustrations of a transition of system operating regimes.

Figure 21A:
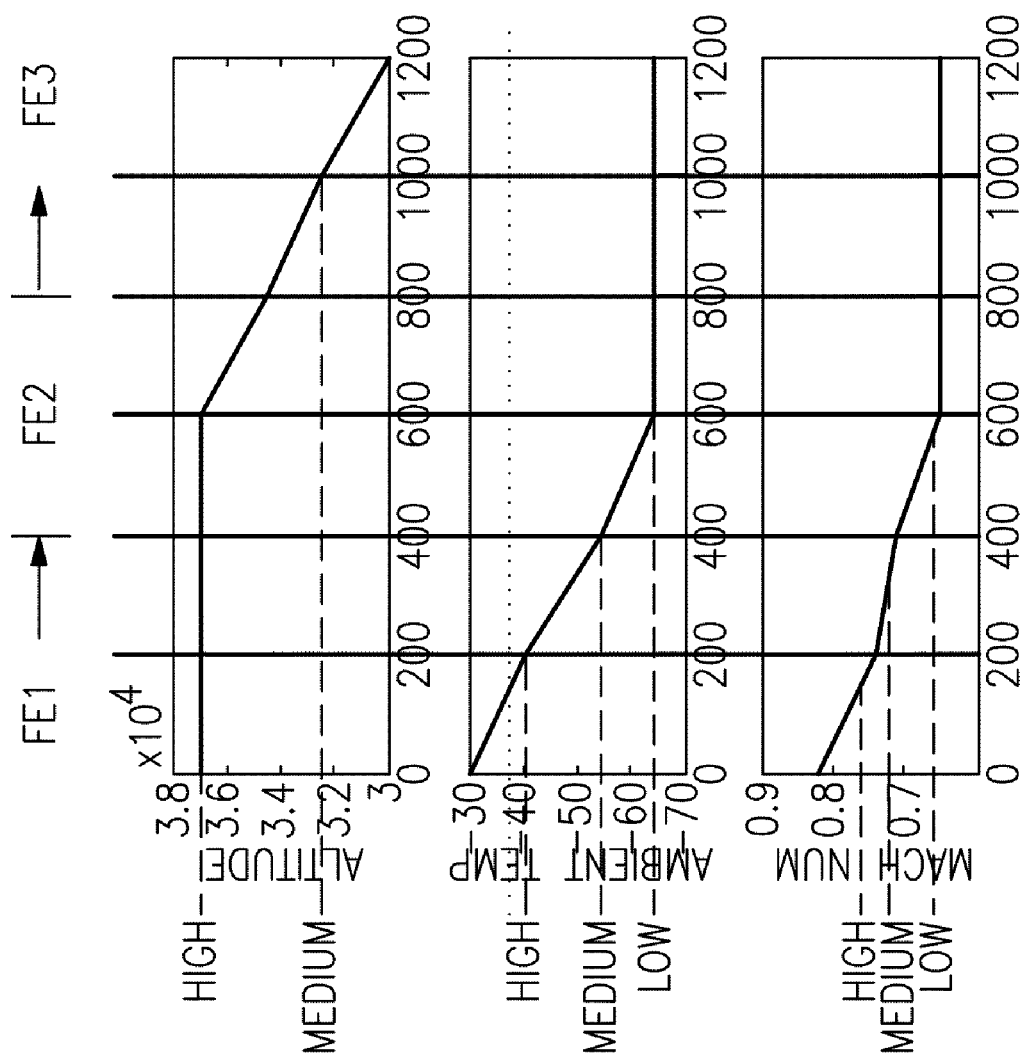
Figure 21B:
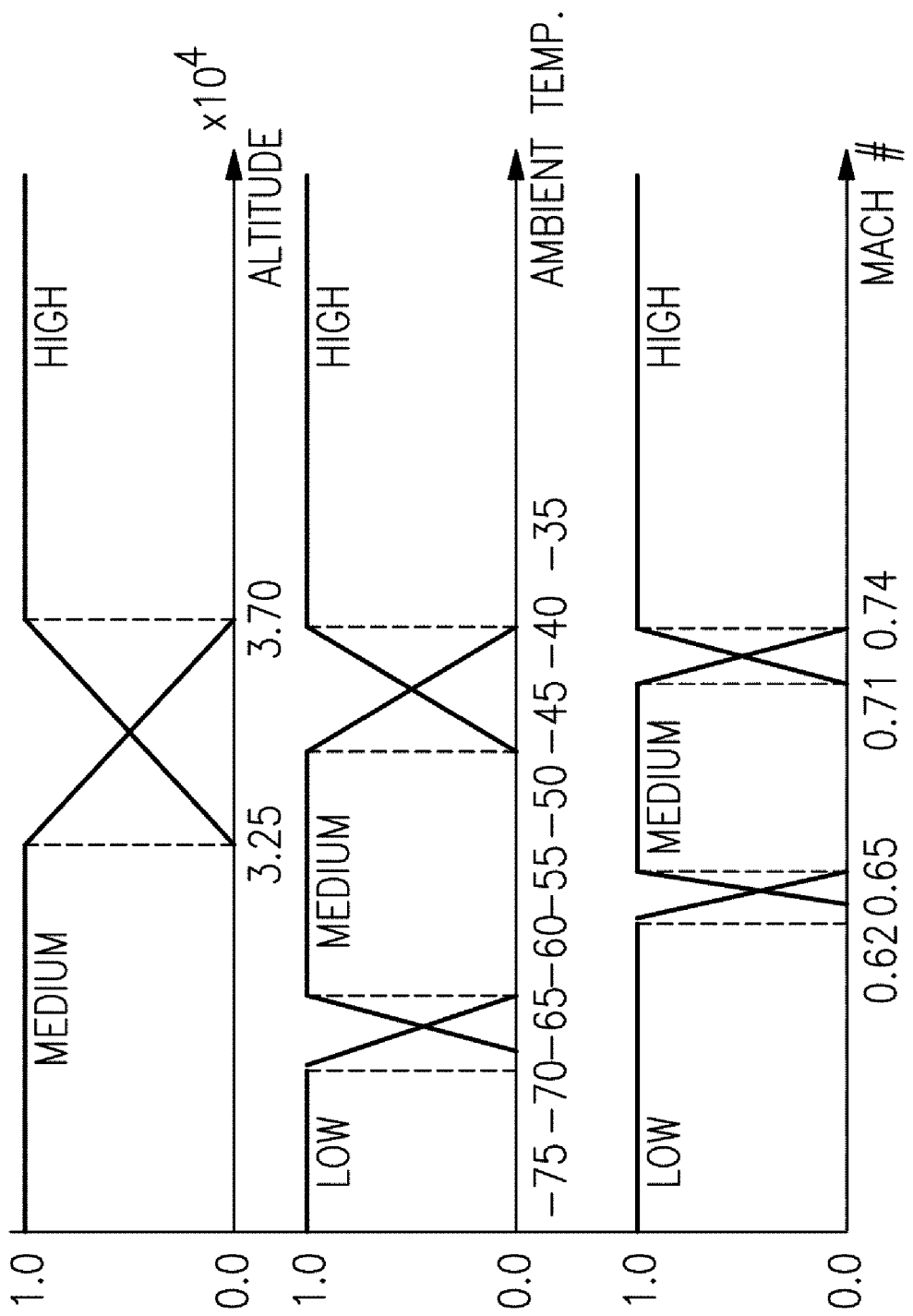

FIGS. 21(a) and 21(b) are illustrations of flight regime transitions and fuzzy membership functions for variables defining flight operating regimes, respectively.

Figure 22:
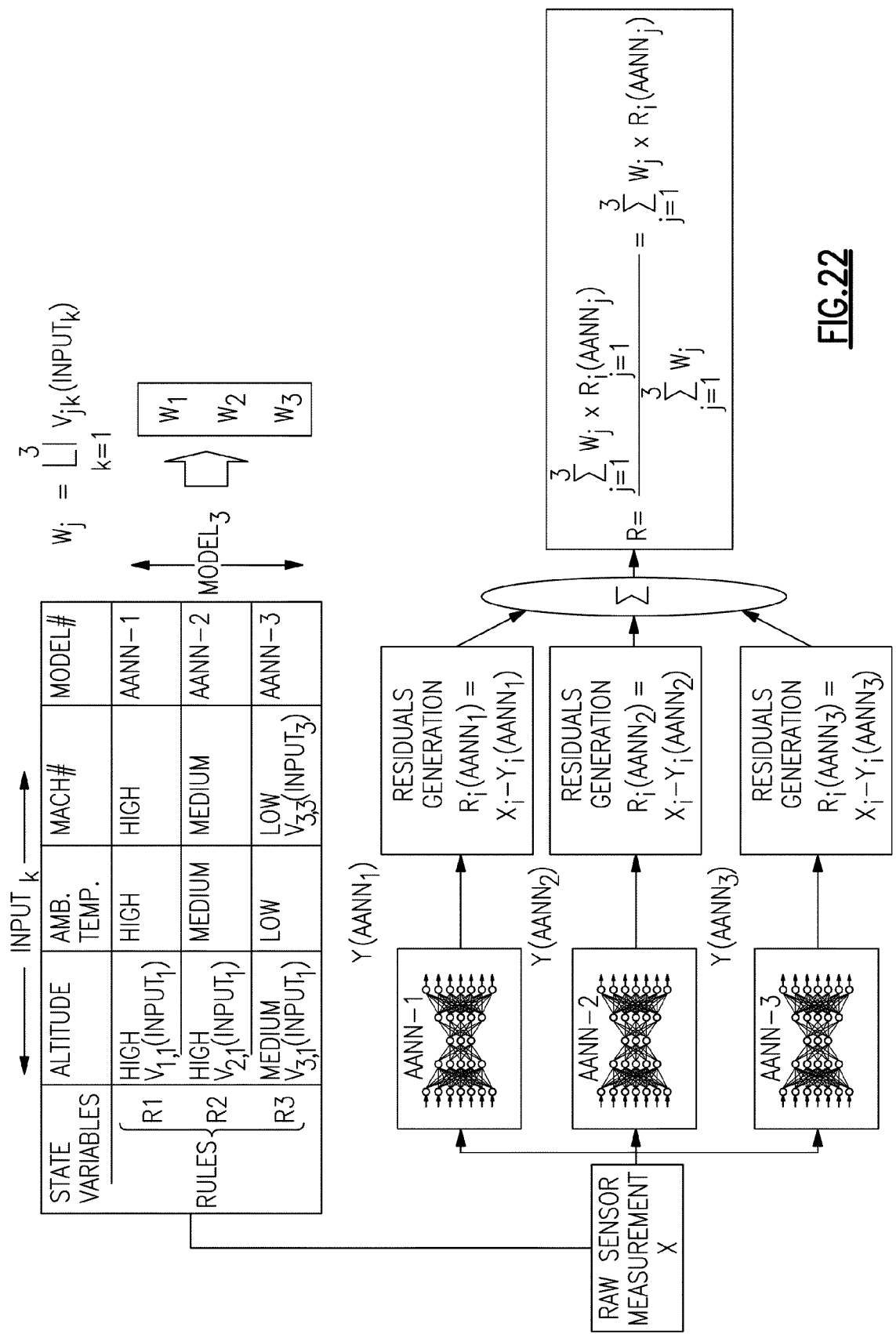

FIG. 22 is a schematic diagram of a scheme of AANN interpolation by fuzzy supervisory model.

Figure 23A:
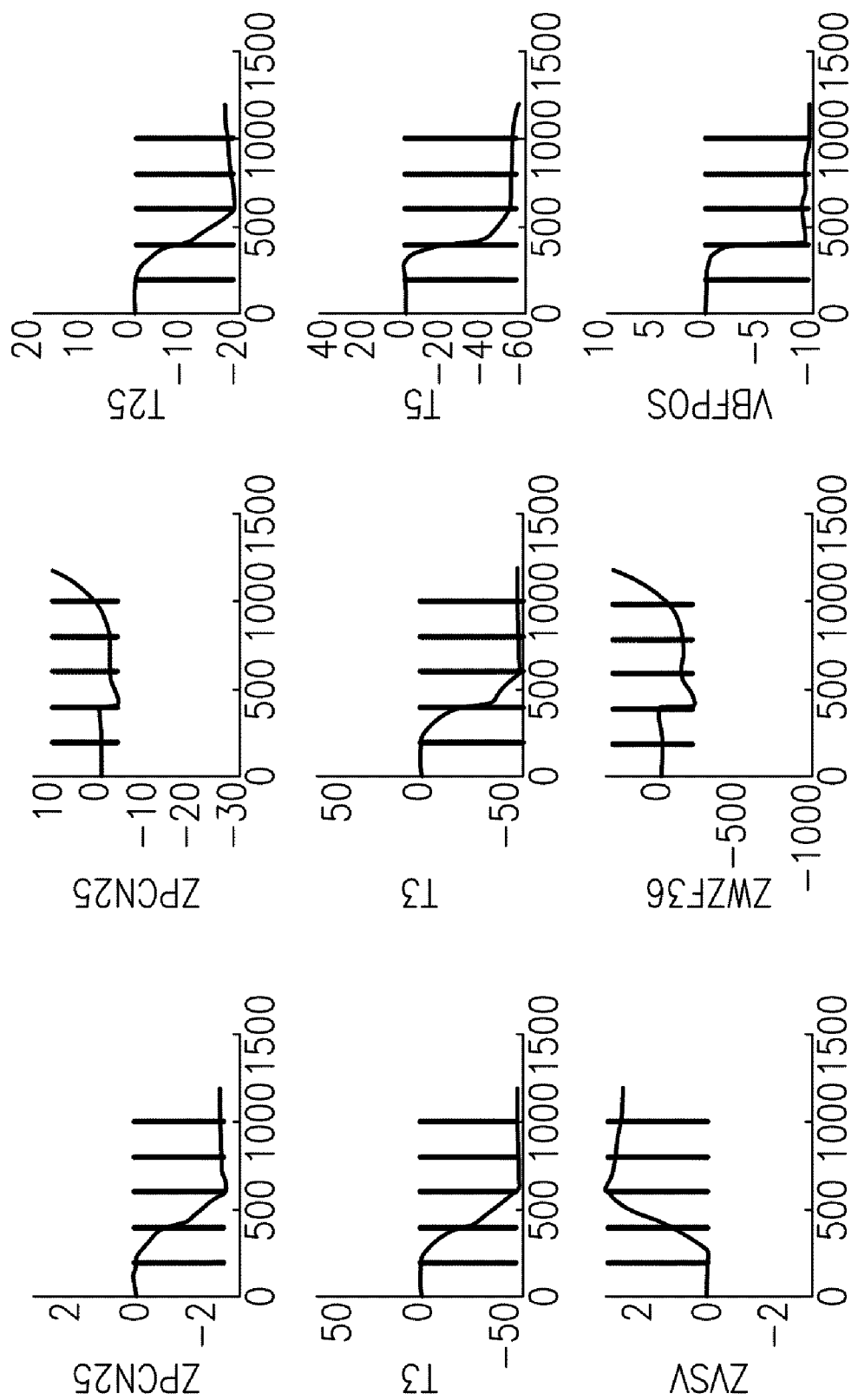
Figure 23B:
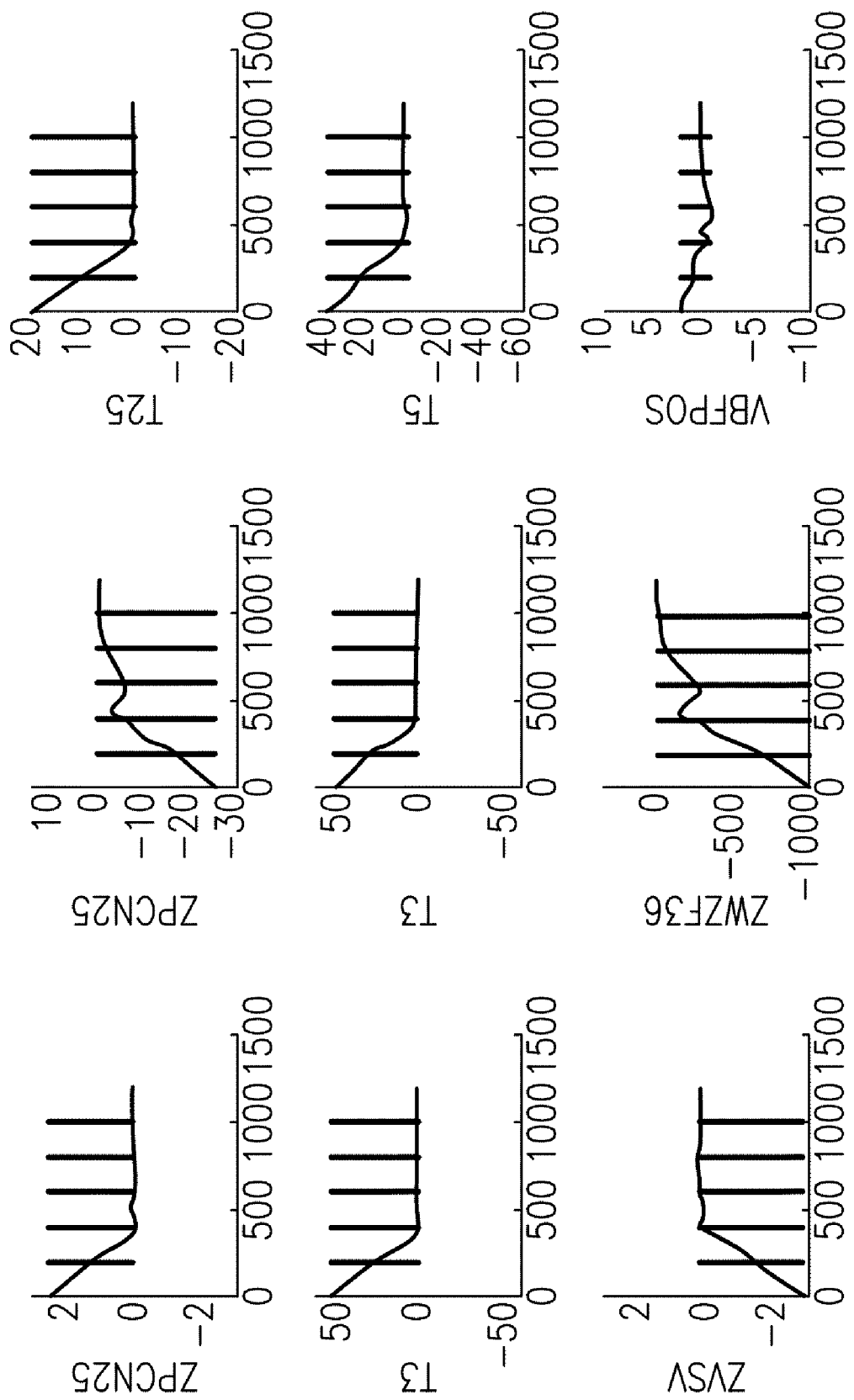
Figure 23C:
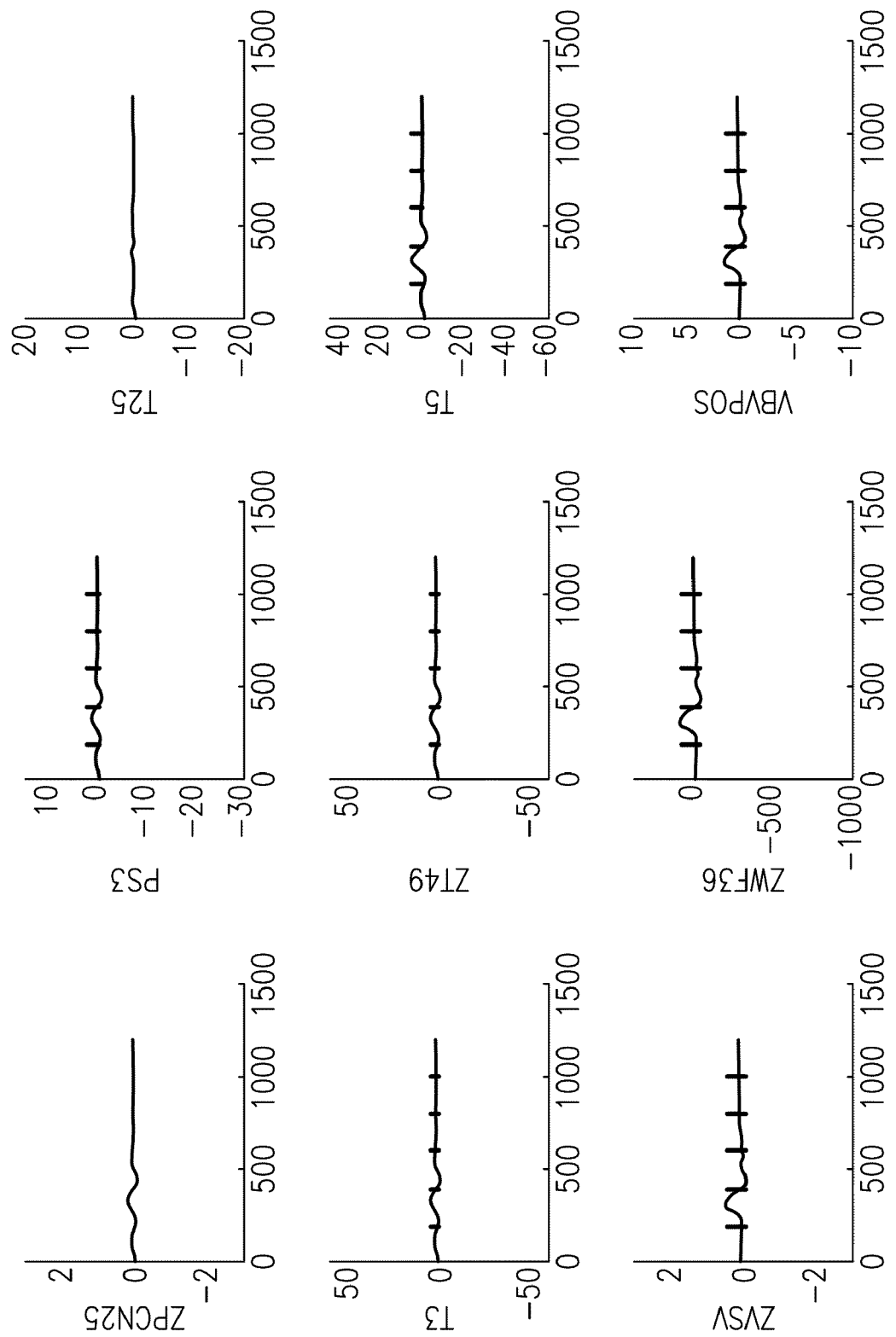

FIGS. 23(A) and 23(B) are graphs of residuals from AANN_1 and AANN_2 as the flight regime transits along the trajectory defined in FIG. 20(A) and FIG. 20(B), and FIG. 23(C) are graphs of residuals from a fuzzy supervisory model.

Figure 24:
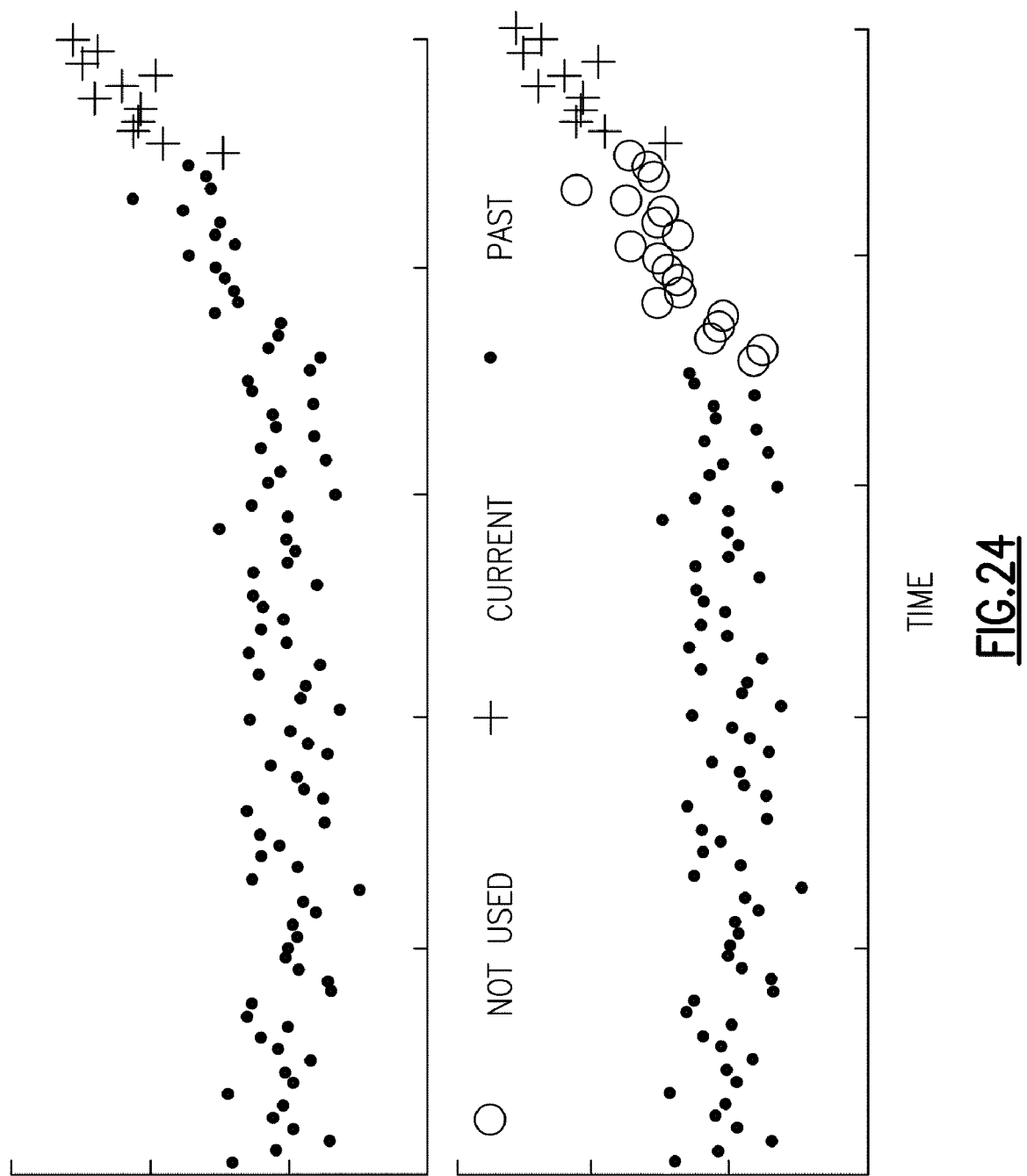

FIG. 24 is a graph of a general approach to time series fault detection that compares "current" points to "past" on the top set of axes, and a small buffer being unused to make differences more pronounced on the bottom axes.

Figure 25A:
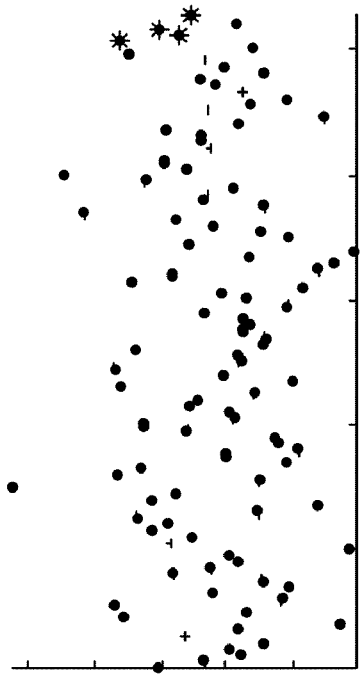
Figure 25B:
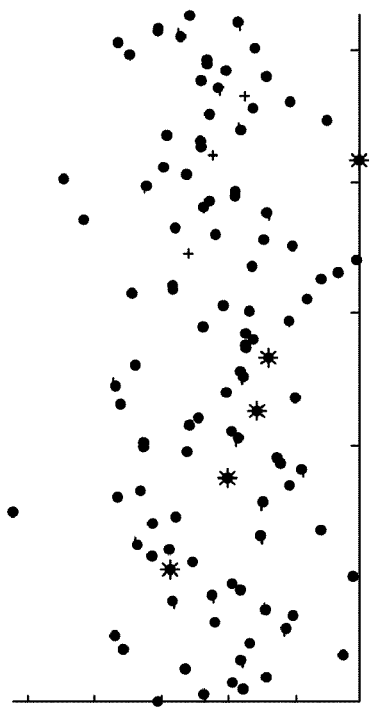
Figure 25C:
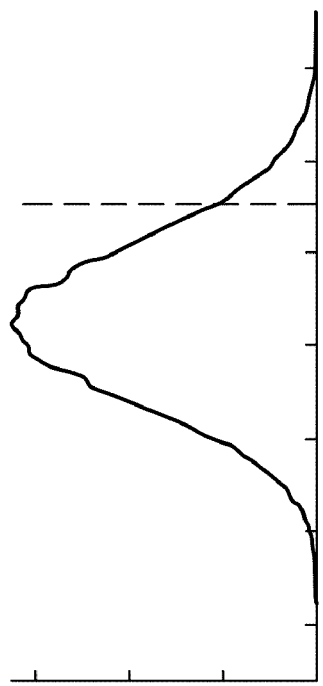

FIG. 25(A)-(C) are illustrations of a permutation test of original data; one realization of a random relabeling, and the distribution of the test statistic for 100,000 permutations (solid line) and for the original ordering (dashed line), respectively.

Figure 26:
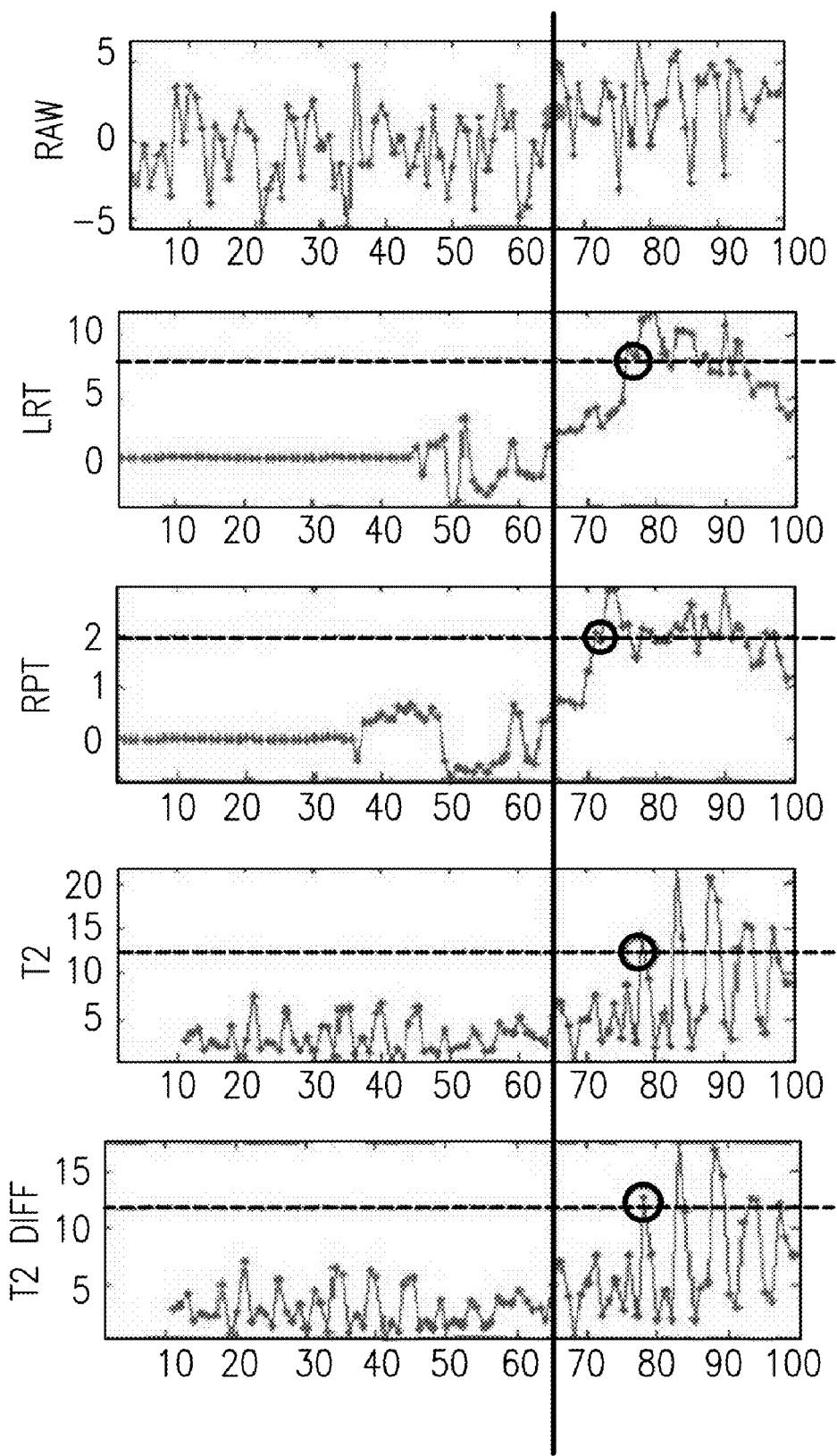

FIG. 26 are graphs that illustrate an example of univariate change detection of a time series with offset change occurred at the red line, and if the dashed lines are alarming thresholds for each technique, then the circled points are where the change is detected.

DETAILED DESCRIPTION

Figure 1:
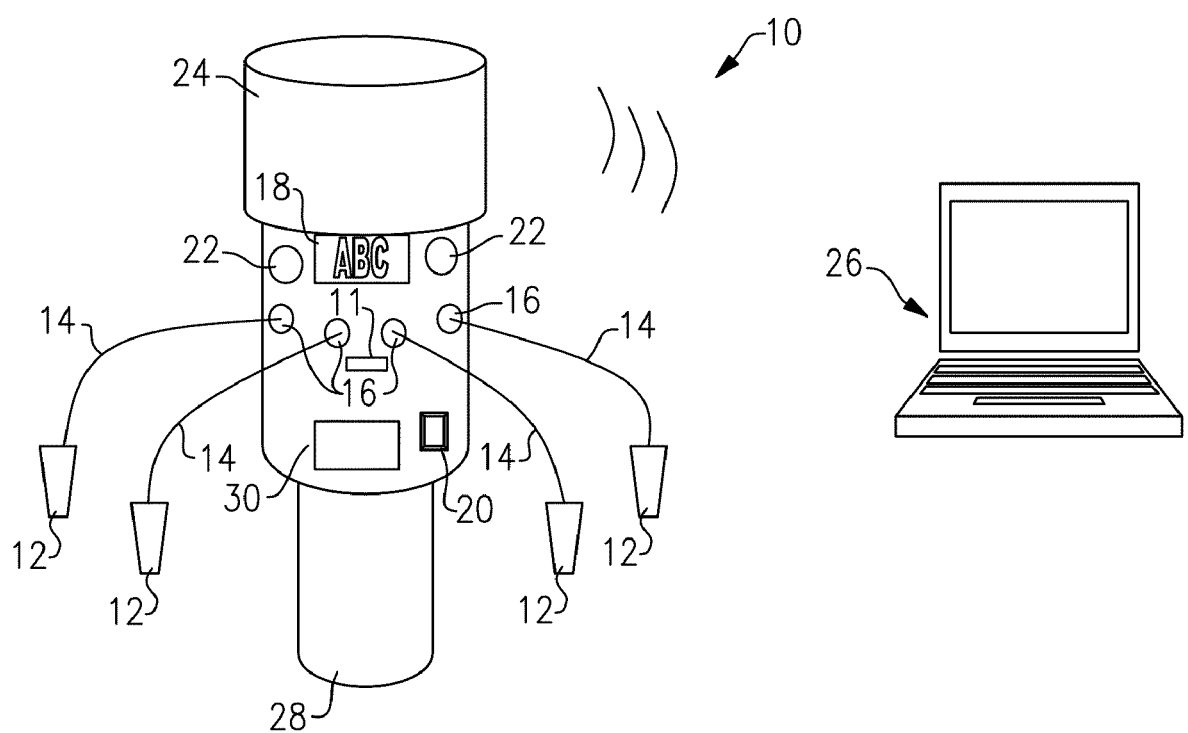
FIG. 1 illustrates a schematic diagram of advanced condition monitoring equipment according to an embodiment of the invention.

Referring to the drawings wherein identical reference numerals denote the same elements throughout the various views, FIG. 1 illustrates a smart sensor system 10 with one or more smart sensor(s) 12 for advanced condition monitoring of one or more pieces of equipment (not shown), such as a turbine, motor, and the like, according to an embodiment of the invention. As defined herein, the one or more pieces of equipment comprises an asset system (not shown). In the illustrated embodiment, four sensors 12 monitor an operating condition of a physical parameter of interest of the one or more pieces of equipment of the asset system to be monitored by the smart sensor system 10. The operating condition monitored by the smart sensor system 10 includes, but is not limited to, pressure, temperature, vibration, and the like. It will be appreciated that the invention is not limited by the number of sensors 12, and that the invention can be practiced with any desirable number of sensors for monitoring the asset system. Also, it will be appreciated that the invention is not limited to the sensors monitoring an operating condition of the physical parameter of interest, and that the invention can be practiced with sensors that monitor any apparatus, device or system with any condition that can be measured by the sensor(s) 12.

The asset system may include equipment with an equipment tag (not shown) that identifies the equipment being monitored by the system 10. Signals from the sensors 12 are produced and transported by a cable 14 to input ports 16 of the smart sensor system 10. There may be a single input port 16 for a plurality of sensors 12, or alternatively, there may be a single input port 16 for each sensor 12. The smart sensor system 10 may have a display and alarm unit 18 on which computational results may be displayed in addition to the analyzer settings, or alarm initiated. The computational results are also available through an output port 20. The smart sensor system 10 is also controllable by one or more local controls 22 that may be set by the operator's hand. The system 10 may also be controlled and also programmed by instructions entered through the input port 30. The system 10 includes a wireless communications unit 24 with a built-in antenna (not shown) for wirelessly transmitting the signals from the smart sensor 10 to a peripheral processing device 26, such as a personal computer, and the like. This feature allows for remote operation through the Internet or other wired or wireless networks. The system 10 also includes a power source 28, such as a battery, energy harvester, and the like. A plurality of such smart sensor systems 10, remotely communicating with a peripheral processing device 26, may be deployed in a distributed fashion to achieve advanced condition monitoring over a widely distributed system (e.g. a power plant, infrastructure assets).

The smart sensor system 10 includes an on-board (built-in) processing unit 11 that comprises computing hardware, memory, and sensor interface circuitry, such as analog-to-digital converters. In one embodiment, the on-board processing unit of the smart sensor system 10 performs a Hotelling's $T^2$ test on the data derived from the sensor inputs 16. As is well known in the signal analysis art, the Hotelling's $T^2$ test is an efficacious test for testing for process shifts, such as shifts in the centroids of clusters of data values. For the Hotelling's $T^2$ test to identify process shifts, it is necessary that one of at least two configurations be followed for an initial monitoring activity. The first configuration is the case wherein there is a plurality of sensors and the monitoring proceeds to try to detect a process shift based on the Mahalanobis distances between the plurality of data clusters. The second configuration is the case wherein there is a single sensor. For this case, it is necessary to process the data from the single sensor with a delayed version of itself.

Figure 2:
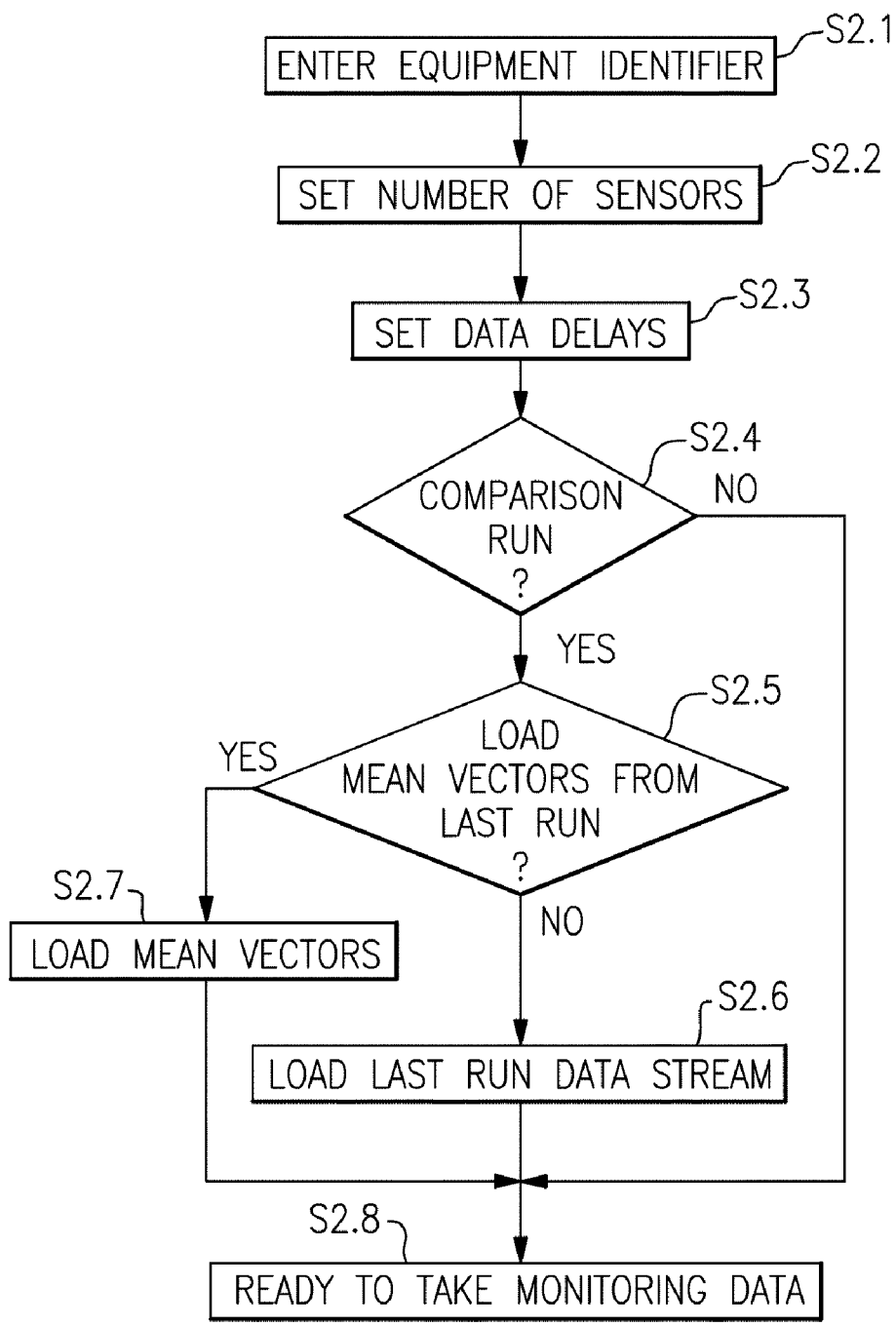
FIG. 2 is a flow chart of an operator control setting sequence.

The smart sensor system 10 can be programmed by two distinct parties for advanced condition monitoring of the asset system. The first party is the equipment technician. The equipment technician sets controls, for example and not by way of limitation, the sampling rate, the number of samples, the analysis window size, selection and tuning of post-filtering operations, data output formatting and transport type, and display formatting of results. The second party is the equipment operator. The operator also sets controls, for example and not by way of limitation, the number and types of sensors to be used, the data delays for sensed data, and the type of data gathering and processing to be performed. A typical flow chart of the operator control setting sequence is illustrated in FIG. 2. In Step S2.1, the equipment identifier is entered into the advanced condition monitoring system 10. The equipment identifier is resident on the equipment identification tag. The equipment identifier may comprise numbers, letters, and other information bearing characters such as, by way of example and not limitation, a barcode. The equipment identifier may also be present electronically and non-visually such as, by way of example and not limitation, an RFID device. The equipment identifier's entry into the advanced condition monitoring system 10 may be via one of several routes including, by way of example and not limitation, operator read and entered visual identification tags, a barcode reader, and an RFID reader. The operator control setting sequence then passes to Step S2.2, wherein the operator sets the number of sensors to be used in the subsequent monitoring activity. The operator control setting sequence then passes to Step S2.3 where the operator sets data delays on the sensor inputs. One embodiment that uses at least one non-zero data delay comprises the monitoring activity wherein there is a single sensor. If the number of sensors entered in Step S2.2 is one and a non-zero data delay is entered in Step S2.3, then the advanced condition monitoring system 10 will configure its processing so that the single sensor data will be processed with its delayed version. The operator control setting sequence then passes to Step S2.4, wherein the operator is queried as to whether the subsequent monitoring activity is to be a comparison run. If the operator enters "No" then the advanced condition monitoring system 10 will configure itself to perform the Hotelling's $T^2$ statistic without involving or referring to data or results of previous monitoring activities for the same equipment identifier and the operator control setting sequence passes to Step S2.8, the advanced condition monitoring system 10 ready to take monitoring data. If the operator enters "yes" then the operator control setting sequence passes to Step S2.5, wherein the operator is queried as to whether the operator wishes to use stored mean vectors from the last monitoring activity. If the operator enters "Yes", the operator control setting sequence passes to Step S2.7, wherein the advanced condition monitoring system 10 loads or otherwise accesses the mean vectors of the last monitoring activity for the same equipment identifier. The operator control setting sequence then passes to Step S2.8, the advanced condition monitoring system 10 ready to take monitoring data. If the operator enters "No" then the operator control setting sequence passes to Step S2.6, wherein it is assumed that the operator wishes to load actual run data from the last monitoring activity for the same equipment identifier. Control then passes to Step S2.8, the advanced condition monitoring system 10 ready to take monitoring data.

The Hotelling's $T^2$ technique was tested using real monitoring data from the GE90 aircraft engine. FIG. 3A presents some exemplary sensor data collected from a turbofan engine over a period, including a time when it was overhauled at the cycle 2N due to deterioration. Shown are three traces versus an abscissa labeled Cycle (#). The top trace is of the exhaust gas temperature (EGT). The middle trace is rate of fuel flow (WFM). The bottom trace is core speed (N2). It will be appreciated that there is no obvious trend of shift in sensor measurements as engine deterioration progresses. FIG. 3B presents the output of the calculation of the Hotelling $T^2$ test involving the data of FIG. 3A. It will be noted that the Hotelling $T^2$ statistic rises from its range of relatively low values to much higher levels indicating a data trend that, in this case, is indicative of deterioration. The increasing $T^2$ statistic reveals the departure of the system state from normality.

Once a change in the complex system's operation has been identified by the Hotelling's $T^2$ statistic, the method proceeds to isolate the system-associated variables driving the departure from normal operation. Overall, the Hotelling's $T^2$ statistic is a simple but very effective technique, with little computational demand. These characteristics make it suitable to be deployed in both online monitoring and handheld devices. If the change in the complex system is caused by a sensor, then the sensor fault can be corrected. On the other hand, if the change in the complex system is system related, then the system fault can be reported.

It is possible, and may be of great utility, to perform selective post-processing on a developed Hotelling's $T^2$ statistic. This post-processing can be designed to reveal such data as rate of statistic rise, time of threshold crossing, and duration of data trend. Post-processing methods and techniques include, for example and not by way of limitation, curve fitting based on L1, L2, or other norm minimization techniques, wavelets, model fitting, median filtering, and other de-noising techniques.

Multivariate Change Detection

In a complex system it is impossible to fully instrument and calibrate all of the many variables from a set of sensors. This is so because a complex system will progress through a very large number of states and furthermore will operate in a very large number of modes, each mode exhibiting a unique normal operational envelope in state space.

It is therefore extremely difficult and perhaps impossible to devise a general test that will reveal the complex system's operational departure from normality, but because of the cost associated with the implementation and deployment of a large complex system, it is essential that innovative efforts be expended to better approximate an efficacious general test for normality departure, the localization in time of such a departure, and identification of the system-associated variables driving the departure from normal operation. It is further desired that a path be developed that will reflect a significant and easily recognized change in the complex system's operational departure from normality that will not require initial analysis of more than a nominal number of test results, i.e., it would be ideal if any significant change in the system's operational state were clearly reflected in a single test result.

One aspect of the method of the invention is that signal processing of monitored data of a complex system is used to determine when the complex system departs from normal operation. The method also identifies the system-associated monitoring variables whose data is indicating a departure from normal operation.

The Hotelling's $T^2$ statistic, or, alternatively $T^2$, is well known in the signal processing art. First proposed by Harold Hotelling, it is the square of the Mahalanobis distance, another well known technique in the statistics art, and is a generalization of Student's t statistic that is used in multivariate hypothesis testing. It is defined with respect to a set of p variables $x=(x_1, x_2, \ldots, x_p)$ having mean values $\mu=(\mu_1, \mu_2, \ldots, \mu_p)$ and p×p covariance matrix, W, where W is formed from n snapshots, $$W = \sum_{i=1}^{n}(x_i - \mu_i)(x_i - \mu_i)'/(n-1)$$

taken of the system-associated variables.

The Hotelling's $T^2$ statistic, $t^2$, is defined as $t^2=(x-\mu)'W^{-1}(x-\mu)$. Expected behavior of the Hotelling's $T^2$ statistic, $t^2$, is based on the assumption that $x=(x_1, x_2, \ldots, x_p)$ constitutes a joint p-variate Gaussian distribution. In practice, one never sees such a distribution. However, the Hotelling's $T^2$ statistic and many other statistics predicated on the same assumption may contribute immense value to system analysis.

When using the Hotelling's $T^2$ statistic, it is generally advisable to provide a training period with data taken from sensors observing the system-associated variables when the system is reasonably believed to be in a stable operational interval. During such an interval, the mean values $\mu=(\mu_1, \mu_2, \ldots, \mu_p)$ are presumed to exist and may be derived by averaging.

It is a change in the p-dimensional covariance matrix, W, or in the mean values, $\mu$ that causes the one-dimensional Hotelling's $T^2$ statistic to exhibit a detectable change. To take advantage of the dimensionality reduction of a plurality of measured system-associated variables into the single Hotelling's $T^2$ statistic, and to efficiently produce the change in the Hotelling's $T^2$ statistic across two sets of snapshots, $\Delta t^2$, the calculation may be accomplished by calculating $$\Delta t^2 = (x^*-\mu)'W_2^{-1}(x^*-\mu^*) - (x-\mu)'W_1^{-1}(x-\mu)$$

where $W_1$ and $W_2$, x and x*, and $\mu$ and $\mu$* are respectively calculated over the first and second sets of snapshots.

Snapshot sensor data were collected from a turbofan engine over a period, including a time when it was overhauled due to deterioration. FIG. 3A shows the normalized sensor measurements of three of the eleven variables: exhaust gas temperature–EGT, fuel flow–WFM, and core speed–N2. From FIG. 3A, we can see that there is no obvious trend or shift in sensor measurements as the engine deteriorates. First, data from the first 1000 flight cycles (points) were used to estimate the sample mean and sample covariance. Next, the $T^2$ statistic was computed directly for all the data, including EGT, WFM, N2 and some other key parameters. In FIG. 3B, we can see the upward trending of the $T^2$ score, showing higher values as we approach the engine deterioration level that caused its overhaul.

The main task involved in the computation of the Hotelling's $T^2$ statistic is the calculation of the covariance matrix. This matrix may be estimated in many ways. These ways include, without implied limitation, a direct approach of first acquiring sequential sets of individual variable values, computing the means of the variables over the acquired values, subtracting the means from the respective sets of variables, and then performing appropriate pairwise multiplication and sample size division. The estimate of the covariance matrix may also be formed by forming minimum volume ellipsoids over the different variable pairs. This method is known to be highly robust in the presence of corrupted data and with the proper handling of outliers and other suspected corrupted data, the method will yield a good estimate of the means of the variables and the entries of the covariance matrix. Still another means for estimating the covariance matrix is by constructing a successive differences estimator over n snapshots. This estimator is constructed from $x=(x_1, x_2, \ldots, x_n)$ as $V_i = x_{i+1} - x_i$ for $i=1, 2, \ldots, n-1$ and is used to form $$W = \frac{1}{2(n-1)} \sum_{i=1}^{n-1} V_i V_i'.$$

In some important cases of system degradation, the means of the system-associated monitored variables may have slow linear drifts. The Hotelling $T^2$ statistic will be more likely to disclose these drifts if the successive differences used to construct the estimate of the covariance matrix are spaced further apart than unity. It is therefore worthwhile to include a processing option that will form successive differences over a sample number difference of $\delta$, $V_i = x_{i+\delta} - x_i$, where $\delta > 1$.

There are numerous possible techniques for spotting a significant change in the Hotelling $T^2$ statistic or the pair-wise changes in the Hotelling $T^2$ statistic over a series of snapshots. These techniques include, by way of example and not limitation, energy tests and higher order moment tests, in particular, use of the excess kurtosis calculated by dividing the fourth cumulant by the square of the variance and then subtracting three (3). FIG. 4 displays a plot of the kurtosis computed over a sliding window of width 20 samples over sample $T^2$ data. Notice that the kurtosis spikes when the first anomalous point enters the window at sample number 55. Other techniques include setting a threshold. A suitable threshold may be devised in a number of ways. By way of example, and not of limitation, the threshold may be chosen by analyzing historical data taken during normal system operation and using a first portion of that historical data to estimate the means of the system-associated monitoring variables and the covariance matrix of the system-associated monitoring variables. A second portion of the historical data, not overlapping with the first portion, may be used to discern the probability density function describing the behavior of the $T^2$ statistic. A threshold may then be set in a number of different ways. One such way, by way of example and not limitation, is to calculate the probability of a false alarm under normal operation and the expected cost of a false alarm and setting the threshold so that the cost per sample under normal operation will be less than or equal to an imposed cost.

System Change and Variable Implication

Once a change in the complex system's operation has been identified by the Hotelling's $T^2$ statistic, the method proceeds to isolate the system-associated variables driving the departure from normal operation. One way to perform this step is to first express the Hotelling's $T^2$ statistic in terms of its principal components. This is done by first representing $T^2$ as:

$$T^2 = \sum_{a=1}^{n} \frac{t_a^2}{\lambda_a} = \sum_{a=1}^{n} \frac{t_a^2}{s_a^2}$$

where $\lambda_a$, $a=1, 2, \ldots, n$, are the eigenvalues of the covariance matrix $W$, and $t_a$ are the scores from the principal component transformation. $s_a^2$ is the variance of $t_a$ (the variance of the principal components are the eigenvalues of $W$). Each score $t_a$ can be expressed as $$t_a = p_a'(x - \mu) = \sum_{j=1}^{n} p_{a,j}(x_j - \mu_j)$$

where $p_a$ is the eigenvector of $W$ corresponding to $\lambda_a$, and $p_{a,j}$, $x_j$, $\mu_j$ are elements of the corresponding vector, associated with the $j^{th}$ variable. By this representation, the contribution of each variable $x_j$ to the score of the principal component a is found to be $p_{a,j}(x_j - \mu_j)$. This information can be used to identify the variable(s) that had the strongest impact to the anomaly measured by the Hotelling's $T^2$ metric.

The next step is to calculate the contribution $cont_{a,j}$ of a variable appearing in the normalized score $(t_a/s_a)^2$. We have $cont_{a,j} = (t_a/s_a^2) p_{a,j}(x_j - \mu_j)$. We then calculate the total contribution of variable $x_j$ by summing $$CONT_j = \sum_{a=1}^{n} (cont_{a,j}).$$

The Hotelling's $T^2$ statistic may now be written as a sum of contributions of all variables over all of the scores as:

$$t^2 = \sum_{a=1}^{n} \frac{t_a}{s_a^2} \sum_{j=1}^{n} p_{a,j}(x_j - \mu_j) = \sum_{j=1}^{n} \left\{ \sum_{a=1}^{n} \frac{t_a}{\lambda_a} [p_{a,j}(x_j - \mu_j)] \right\}.$$

As an example, and not by way of limitation, of the technique to determine when the complex system departs from normal operation and to assess the contributions of the various variables, consider that there are six variables $x_1$, $x_2, \ldots, x_6$ that exhibit sequential values as graphed in FIG. 5. The data used for the six variables $x_1, x_2, \ldots, x_6$ was derived from independent sampling of a Gaussian random variable generator and then modified according to:

$x_1(55) = +4$ $x_2(60) = -4$ $x_3(65) = +3$ $x_4(65) = -3$ $x_5(81:85) \leftarrow x_5(81:85)+3$ $x_6(81:85) \leftarrow x_6(81:85)+3$ The Hotelling $T^2$ statistic, $T^2$, is computed on the data of FIG. 5, wherein the covariance matrix is estimated using the first 50 samples of each of the six variables. The next step is to illustrate the different contributions from the six variables to the Hotelling $T^2$ statistic at the points that the statistic is above a threshold. This may be done in several ways. For example, and not by way of limitation, the magnitudes, $M_{i,j}$, of the contribution of the j-th variable to the score of the principal component at data point i is $M_{i,j}=|p_{i,j}(x_j-\mu_j)|$ and the relative magnitude normalized over all of the variable contributions of the magnitudes is denoted as, $M'_{i,j}$, and calculated as $$M'_{i,j} = \frac{M_{i,j}}{\sum_{j=1}^{n} M_{i,j}}.$$

The contribution magnitudes and relative magnitudes may be displayed using color-coding for aiding the operator in interpreting the results. FIG. 6 illustrates the different contributions from the six variables to the Hotelling $T^2$ statistic at all 100 points using color coding. The color-coded block grid displays the relative contributions on the ordinate from the six variables $x_1, x_2, \ldots, x_6$, listed on the abscissa.

In another embodiment outliers, such as those identified in FIG. 7, may also be distinguished by an entropy measure, $E_i$, where $$E_i = -(1/\ln(n))\sum_{j=1}^{n} M'_{i,j} \ln(M'_{i,j})$$

and a minority-decision measure, $m_i$, where $m_i=1-\max_j(M'_{i,j})$. FIG. 7 plots $E_i$ and $m_i$ for those $T^2$ points exceeding a threshold. For purposes of illustration, two different thresholds are considered. The first threshold, FIG. 7 left, is the threshold that results in 5 of the $T^2$ computations exceeding the threshold. The second threshold, FIG. 7 right, is a lower threshold that results in 10 of the $T^2$ computations exceeding the threshold.

As another example of the technique to determine when the complex system departs from normal operation and to assess the contributions of the various variables, consider that there are nine critical sensors $x_1, x_2, \ldots, x_9$ from GE90 cycledeck model that exhibit sequential values as graphed in FIG. 8. The data used for the 9 variables $x_1, x_2, \ldots, x_9$ were generated while the cycledeck was simulated under normal flight condition without loss of efficiency and flow. We can regard those data "no fault" data. To simulate sensor fault, we intentionally modified some of the sensor readings at different time:

$ZPCN25(130)=100$ $PS3(150)=170$ $T3(170)=1310$ $ZT49(181:185)=1770$

The next step is to illustrate the different contributions from the nine variables to the Hotelling's $T^2$ statistic. This may be done in several ways. The contribution magnitudes and relative magnitudes may be displayed for aiding the operator in interpreting the results. The display may be color-coded. FIG. 9A displays a relative contribution magnitude map as indicated. The grid displays the relative contributions on the ordinate from the nine variables $x_1, x_2, \ldots, x_9$, listed on the abscissa. $T^2$ statistic is calculated based on the time series data from the 9 sensors, shown in FIG. 9B. The location of the peaks in the $T^2$ statistic values corresponds to where the sensor faults were injected. The sensor variables with high contribution are implicated for the change in $T^2$ score. Promisingly, the sensors identified through variable contribution analysis are the exactly the sensors with injected fault.

To simulate system fault, we reconfigured the cycledeck model parameter flow and efficiency, operating from a normal condition ("nofault") to a system fault. As shown in FIG. 10, the points after the dash lines correspond to system fault. In FIG. 12, $T^2$ statistic ramps up quickly from 200 where the system fault starts. Moreover, the contribution analysis recognizes the sensors with deviation from normality accurately, shown in FIG. 11. To some extent, this is a way of differentiating sensor and system faults as it is highly unlikely for multiple sensors to have fault at the same time.

Once abnormal behavior has been detected, an alert reporting results of the analysis may be communicated to the system monitoring authorities in any of a variety of ways including, but not necessarily limited to, electrical cabling, information transfer via power line conduction, an intranet, the Internet, or wirelessly.

Sensor Validation

For a reliable condition monitoring it is necessary to have accurate sensor information. However, sensors may sometimes be faulty or may even become unavailable due to failure or maintenance activities. Sensor validation is therefore a critical part of condition monitoring. Traditional approaches to sensor validation involve periodic instrument calibration. The calibrations are expensive both in labor and process down time.

To address the problems associated with sensor validation, the invention uses an Auto-Associative Neural Network (AANN) based sensor validation model that can perform on-line calibration monitoring of platform-deployed sensors. The characteristic of the model allows the detection of sensor drift or failure by comparing the raw sensor measurements, which is the model input, with the corresponding model-based estimate of the sensor values. In addition, a supervisory analysis of the residuals between raw or actual sensor measurements and sensor estimation can help differentiate between sensor fault and system fault. By definition, a residual is the difference between an actual measured or sensed value and the corresponding estimated value. A residual vector is the difference between a set of actual values and the corresponding set of estimated values. A significant deviation in residuals for a small subset of sensor measurements would indicate a sensor(s) fault, while a significant deviation in residuals for a large subset of sensor measurements would indicate a system fault. A deviation in residuals from a single sensor is typically an indication of a sensor fault, whereas a plurality of deviations in residuals from a plurality of sensors is typically an indication of a system fault.

The inputs to the AANN go through a dimensionality-reduction, as their information is combined and compressed in intermediate layers. For example, in FIG. 13, the seven nodes in the input layer are reduced to 5 and then 3 nodes, in the $2^{nd}$ layer (encoding) and $3^{rd}$ layer (bottleneck), respectively. Then, the nodes in the $3^{rd}$ layer are used to recreate the original inputs, by going through a dimensionality-expansion ($4^{th}$ layer, decoding, and $5^{th}$ layer, outputs). In the ideal case, the AANN outputs should be identical to the inputs. Their difference (residuals FIG. 14) are used in fault diagnosis decision making 260.

This network in essence, computes the largest Non-Linear Principal components (NLPCA)—the nodes in the intermediate layer—to identify and remove correlations among variables. Beside the generation of residuals as in this application, this type of network can also be used in dimensionality reduction, visualization, and exploratory data analysis. It is noted that PCA identifies only linear correlations between variables, while NLPCA uncover both linear and nonlinear correlations, without restriction on the character of the nonlinearities present in the data. NLPCA operates by training a feed-forward neural network to perform the identity mapping, where the network inputs are reproduced at the output layer. The network contains an internal "bottleneck" layer (containing fewer nodes than input or output layers), which forces the network to develop a compact representation of the input data, and two additional hidden layers. The nonlinear functions embedded in the hidden nodes are typically of the tansig type, while the central bottleneck layer has linear transformation functions embedded.

Physical models can be utilized to generate the nominal value of sensor readings under different operating conditions so that the residuals (FIG. 16) between raw sensor measurement and nominal reading can be used to trend changes over time. However, when a physical model is not available, nominal sensor readings have to be inferred directly from raw measurements. Previously, Auto-Associative Neural Networks (AANN) have been used for sensor validation when information in the measurements is analytically redundant in the sense that if one measurement is lost, it can be replaced with an estimate from the remaining valid sensors. On the other hand, the invention uses AANN to estimate sensor measurement under normal conditions and then the residual between raw measurement and normal measurement can be used to infer anomaly conditions in the sensor/system.

We used a nine-valued state vector representing aircraft engine data generated from the GE90 cycledeck model. Using this data set, we built a 9-5-3-5-9 AANN, following the architecture illustrated in FIG. 13. A neural network for estimating the sensor values is illustrated in FIG. 14, wherein the neural network of this embodiment possesses, for example purposes only and not by way of limitation, 7 inputs, 5 encoding layer nodes, 3 bottleneck layer nodes, 5 decoding layer nodes, and 7 outputs. We refer to such a neural network architecture as 7×5×3×5×7. The structure 200 displays the actual sensor values, grouped for graphical convenience, in box 210 and input to the input layer 215 of a 5-stage neural network 270. The actual sensor values are also sent to combiner 250. As is well known in the neural network art, the outputs of the input layer 215 are input to the encoding layer 220. The outputs of the encoding layer 220 are input to the bottleneck layer 225. The outputs of the bottleneck layer 225 are input to the decoding layer 230. The outputs of the decoding layer 230 are input to the output layer 235. The outputs of the decoding layer 235 constitute the estimates of the sensor values, grouped for graphical convenience in the box 240. The sensor value estimates are sent to combiner 250 where the residuals 255 are formed by subtracting the actual sensor values from the estimated sensor values. The residuals are input to module 260, which performs decisioning on the residuals in order to discern and report any inferred fault diagnostics. There are two optional inputs to the decision-making module 260. The first of these inputs 212 is from the internal information module 211 and comprises processed internal information. The processed internal information includes, by way of example and not limitation, physics-based models and relationships that are known to exist among and between the actual sensor values 210. These values are input to the internal information module from the actual sensor values 210. The second of these inputs 214 is from the external information module 213 and comprises collected and processed external information that includes, by way of example and not limitation, plant information, entered automatically or manually, concerning operator notes, plant power supply parameters such as power quality, temporary change to equipment operating points, and environmental factors. The fault diagnostic may include, by way of example and not limitation, such well-known statistical techniques as the sequential probability ratio test (SPRT).

FIGS. 15A and (B) illustrate a sample of typical raw sensor measurements in FIG. 15(A), and their corresponding residual values in FIG. 15(B), when no fault is present in the system or in the sensors. Under these circumstances, the residuals are typically two orders of magnitude smaller than the raw data. We then injected a large step function in the sensor measuring the fifth variable (ZT49) and noted that the corresponding residual exhibited the largest impact, while the other residuals showed much smaller changes. This is illustrated in FIG. 16.

To automate the detection process, we suggest normalizing the residuals $R_i$ using the average of the raw data measurements, i.e.:

$$E_i = \frac{R_i}{\overline{X}_i}.$$

Then we can compute a figure of merit, such as $$FOM = \sqrt{\frac{1}{nm}\sum_{i=1}^{n}\sum_{j=1}^{m}\left(\frac{R_{ij}}{\overline{X}_i}\right)^2}$$

to evaluate the overall magnitude of the residuals. IF FOM is smaller than a specified threshold, we can declare that no anomalies are present. Otherwise, the anomaly is detected. When there is a large (in percentage) residual value, we identified the anomaly as a sensor fault. When all residuals are larger than the baseline but are roughly equally contributing to the FOM, then there are two possibilities:

(1) It is a system fault; or (2) The AANN is not appropriate for generating residuals (i.e., the AANN was trained in a different region of the state space from the one where the current raw data have been extracted.

Sensor Validation for Different Operating Conditions

When the operating condition or mode under which the system operates changes, the characteristics of the system might change accordingly. For example, gas turbines have operating modes such as base load, part load and full load. Under each mode, the system behaves differently, captured by the system output (power etc.) and its sensor measurements (temperature, pressure, vibration etc.). In the previous section, we leveraged the AANN model to perform sensor validation within a known operating regime. Essentially, an AANN model was used to learn the system characteristics. When the operating regime changes, the underlying AANN model needs to be changed (or re-trained) as well.

As an example, and not by way of limitation, consider that the monitored machinery is a jet engine, such as a GE90 aircraft engine, that is being monitored according to altitude (ALT), ambient temperature (Tamb), and Mach number (Mach). Consider that the engine operates in three different operating regimes and that it is known when transitions between operating conditions are known. FIG. 17 illustrates the example in which three operating conditions are represented as two-dimensional projections of volumes in a three-dimensional space having the axes of altitude, Mach number, and ambient temperature. The projection of the volumes onto the two-dimensional altitude-ambient temperature space is illustrated in FIG. 17. The associated graphs depicted represent the projections of the volumes onto the three axes of altitude, Mach number, and ambient temperature. The trajectory of the jet engine's operation in, through, and between the operating trajectories is known as the flight envelope or FE. 1000 normal operating points were randomly generated from each operating regime. For each operating point generated, there is a nine-valued state vector corresponding to it.

Using this data set, we built three 9-5-3-5-9 AANNs, following the architecture illustrated in FIG. 13 for the three operating regimes, respectively. During the training phase of each AANN model, 900 data points were used. The remaining 100 data points were reserved for the test. FIGS. 18(A)-(C) show the residuals of AANN models on the test set from different operating regimes. Since AANN1 was trained within the operating regime 1 which testset1 was drawn from, the residuals in FIG. 18(A) are small. Same for AANN3 on testset3 as in FIG. 18(B). However, when AANN1 was tested on the testset2 in FIG. 18(C), which is from a different operating regime, the residuals are typically one or two orders of magnitude higher than the previous case.

Another way to cope with different operating regimes is build a global model over all the operating regimes. So, when an operating regime changes, the global model can be used to capture the behavior of the system. However, because of the fact the model is built over the entire operating regime, it is less accurate in capturing the characteristics of the system in local regimes. FIGS. 19(A)-(C) show the residuals of a global AANN model on the test set from different operating regimes. Since the global AANN model was trained on all the three (3) local operating regimes, the residuals on testset2 (FIG. 19(C)) are much smaller than the one in FIG. 18(C). However, the residuals in FIGS. 19(A) and (B) are larger than the ones in FIGS. 18(A) and (B).

Building local models is superior to building a global model in terms of better capturing the local system characteristics, if the local operating regimes can be identified.

Fuzzy Supervisory Models for Operating Condition Transitions

Typically, an industrial asset or system is operated under different conditions/modes. The system behaves differently corresponding to different operating conditions. To better represent sensor characteristics under different operating conditions, multiple sensor validation models are desired to capture the relationship among the sensors. How to automatically detect the change of operating conditions and decide the appropriate local sensor validation model becomes an issue.

Local models can capture the system dynamics within its specified operating regimes. However, in a transition regime none of the customized local model can accurately capture the dynamics of system. So, the residuals generated during the transition phase will exceed the alarming threshold and cause false positive alarms. One common solution currently deployed to this problem is to ignore the alarms generated if we know that the system undergoes transition of operating regimes. The disadvantage of this approach is the interruption of system monitoring using local models and the risk of missing some true fault alarms generated during the transition phase.

In general, the invention addresses these problems using a fuzzy supervisory model blender to manage the transition between sensor validation models based on operating condition changes. Specifically, we use fuzzy logic (FL) to write rules for a supervisory model to control the transition of local models when an operating regime changes. There is a vast literature devoted to fuzzy logic and its use in rule-based approximate reasoning. Linguistic IF-THEN rules with appropriate mathematical constructs are built into the supervisory model to decide the fitness of local models to current operating conditions. The degree of fitness of different local models is taken into consideration when weighing the contribution of residuals from local models to the fused output. GE90 cycledeck simulator was used to generate data for demonstration. Experimental results has shown that with the supervisory model controlling the transition of local sensor validation models sensor estimations are more accurate and more robust to operational condition changes.

Fuzzy logic gives us a language, with syntax and local semantics by which we can translate qualitative knowledge about the problem to be solved. In particular, FL allows us to use linguistic variables to model dynamic systems. These variables take fuzzy values that are characterized by a label (a sentence generated from the syntax) and a meaning (a membership function determined by a local semantic procedure). The meaning of a linguistic variable may be interpreted as an elastic constraint on its value. These constraints are propagated by fuzzy inference operations, based on the generalized modus-ponens. This reasoning mechanism, with its interpolation properties, gives FL a robustness with respect to variations in the system's parameters, disturbances, etc., which is one of FL's main characteristics.

The most common definition of a fuzzy rule base R is the disjunctive interpretation and found in most Fuzzy Controller applications as:

$$R = \bigcup_{i=1}^{m} r_i = \bigcup_{i=1}^{m} (\overline{X}_i \rightarrow Y_i)$$

R is composed of a disjunction of m rules. Each rule defines a mapping between a fuzzy state vector and a corresponding fuzzy action. The Cartesian product operator represents each rule.

The inference engine of a FC can be defined as a parallel forward-chainer operating on fuzzy production rules. An input vector $\overline{I}$ is matched with each n-dimensional state vector $\overline{X}_i$, i.e., the Left Hand Side (LHS) of rule ($\overline{X}_i \rightarrow Y_i$). The degree of matching $\lambda_i$ indicates the degree to which the rule output can be applied to the overall FC output. The main inference issues for the FC are: the definition of the fuzzy predicate evaluation, which is usually a possibility measure; the LHS evaluation, which is typically a triangular norm; the conclusion detachment, which is normally a triangular norm or a material implication operator; and the rule output aggregation, which is usually a triangular conorm for the disjunctive interpretation of the rule base, or a triangular norm for the conjunctive case. Under commonly used assumptions we can describe the output of the Fuzzy System as $$\mu_Y(y) = \text{Max}_{i=1}^{m} \{\text{Min}[\lambda_i, \mu_{Yi}(y)]\}$$

where $\lambda_i$ is the degree of applicability of rule $r_i$ $$\lambda_i = \mathrm{Min}_{j=1}{}^n \Pi(X_{i,j}, I_j)$$

and $\Pi(X_{i,j}, I_j)$ is the possibility measure representing the matching between the reference state variable. These three equations describe the generalized modus-ponens, which is the basis for interpreting a fuzzy-rule set.

We used the same three local AANN models built on the three local operating regimes previously described. The operating regime of the simulated system gradually shifted from the flight envelope FE 1 to FE 3 along the trajectory shown in FIG. 20(A). FIGS. 20(A) and (B) are the different representations of the transition of operating regimes.

A fuzzy membership function is developed that uses the axes that define the volumes of the operating conditions. This is illustrated in FIGS. 21(A) and (B), which show the values of flight envelope variables as the simulated system transits in different operating regimes. On the left side of the figure, we see the definitions of the membership functions for "Low", "Medium" and "High" of flight envelope variables.

Then, we can specify a fuzzy rule set of three fuzzy rules, such as the ones described in Table 1, which describe the applicability of local models under different operating regimes defined in fuzzy terms.

TABLE 1

Fuzzy Rule set describing model applicability under different operating regimes.

| State Variables | | Altitude | Amb. Temp | Mach # | Model # |
|---|---|---|---|---|---|
| RULES | R1 | High | High | High | AANN-1 |
| | R2 | High | Medium | Medium | AANN-2 |
| | R3 | Medium | Low | Low | AANN-3 |

In FIG. 22, we show the scheme of using a fuzzy supervisory model to control the switch of local models and assure the smoothness of residuals by interpolation as the flight regime transits. On the left side of the figure, we see raw sensor measurements are presented to three local AANN models to generate the residuals, respectively. The state variables that define operating regimes are fed through the fuzzy rule set to determine the applicability of each local AANN model. The normalized applicability of each model is then used to perform a weighted average of the residuals from each individual local model to generate an integrated overall residual.

In FIGS. 23(A) and (B), we show examples of residuals between actual sensor measurements and estimations from local model AANN_1 and AANN_2, respectively as the flight regime transits along the trajectory defined in FIG. 20(B). Clearly, a local model can only minimize the residuals within the flight regime for which it was built and trained. However, the fuzzy supervisory model can leverage the superiority of individual local models in the flight regimes for which they were built and blend local models to ensure the smoothness of residuals during transition of operating regimes, as is seen in FIG. 23(C).

Univariate Change Detection

Up to this point, all the techniques described above were based on the assumption that there is more than one sensed variable per asset. However, there are a wide variety of field-deployed assets, such as balance of plant assets, which typically have only one sensed variable per asset to monitor their behavior. For these assets, multi-variate change detection and condition monitoring methods will not apply. To specifically address this single sensor per asset case, we have leveraged a family of techniques including the Hotelling $T^2$ statistic, Likelihood Ratio Test, calculation of excess kurtosis, and Rank Permutation transformation methods for univariate change detection. However, coupled families of these assets may be monitored as a group using multi-variate techniques.

Rank Permutation Transformation (RPT)

Rank permutation transformation (RPT) is tailored towards time series. The general approach for fault detection in a time series used here is to compare a test statistic for the "current" data (a few recent data points) to the "past" data (some typically larger number of points prior to "current"), possibly with a buffer of unused points in between to make differences more pronounced, as shown in FIG. 24.

Using ranks rather than absolute values solves a number of problems. First, the problematic effect of outliers is vastly diminished. The rank transformation is employed to great advantage in nonparametric statistics. The rank distribution for a given number of data can be calculated in advance, making implementation at run time very fast (an important consideration for real-time embedded applications that have little computational power to spare).

The principle of using random permutations of the data to develop an exact or near exact probability of occurrence is illustrated in FIGS. 25(A)-(C). FIG. 25(A) shows the original data. The null hypothesis is that the last five asterisk points are drawn from the same distribution as the previous dot points. If the null hypothesis is true, then a statistic (say, the mean) calculated for the asterisk points should be about the same as the same statistic for any five points randomly selected from all of the data. If we keep the data the same, and randomly permute the labels (asterisk or dot), and calculate the "mean of five asterisk points" statistic many times, we get the distribution shown in FIG. 25(C). This procedure suggests that any five points randomly selected from all points will have a mean as great as the original five only 7.2% of the time. Similarly, any sample of data can be compared to another sample (e.g., using the now vs. recent past approach outlined above), and an exact (to an arbitrary number of significant figures) probability that the samples differ on any test statistic can be calculated.

Putting both ideas (using rank rather than raw data and permutation distributions), the "rank permutation transformation" (RPT) can be used to transform raw, poorly behaved time series into features (decisions) which inform about the pattern changes in data. To calculate RPT, one must first define a small number of points to be the "current" set and a (typically larger) number of points to be the "past" set. The two sets of data are first concatenated and the ranks of the combined data are calculated. The sum of the ranks for the original ordering (the test statistic) for the "current" data is calculated. Specifically, the data labels (current/past) are randomly permuted, and the test statistic is calculated; this step is repeated many times (e.g., 5,000). The value of the test statistic for the original ordering of the data is compared to the values generated via the permutations, and the probability of the original ordering occurring by chance is calculated. The value of the $\log_{10}$ Probability (the output of the RPT) is taken to emphasize rare events. For example, the value of 10 ($\log_{10} 10^{10}$) means that the rareness of the event is one in 10 billion. The algorithm for calculating RPT is well-known in the art.

The rank permutation transformation was employed on the case data to generate test statistics. When the test statistics exceeds a predetermined threshold, a change was reported.

Likelihood Ratio Test (LRT)

Likelihood ratio test studies the change of distributions in sequential data. To that end, it is well suited for change detection in a time series and has been well practiced. The general formation of the problem for LRT is stated as follows.

Consider a scalar time series, x(t), where the t is the current time index. The current time index t divides the time series into two subsets, $x_1(t) = \{x(i)\}_{i=t-n_1,\ldots,t-1}$ (immediate past) and $x_2(t)_{i=t,\ldots,t+n_2-1}$ (immediate future). Each subset complies with some probability density function (pdf), $p_1(\theta_1)$ and $p_2(\theta_2)$, respectively. Let t be some time instant, the LRT is a Neyman-Pearson test for deciding between two hypotheses:

$$\begin{cases} H_0: p_2 = p_1, & \text{(no change occurs)} \\ H_1: p_2 \neq p_1, & \text{(a change occurs)} \end{cases}$$

The parameter of the pdf before the change, or after the change is not known. Nor is the change point, time T. Nevertheless, the log-likelihood ratio can be formed between the posited hypotheses $H_1$ that a change occurs at time T and the null hypotheses $H_0$ that no change occurs within n samples:

$$LR = \ln\left(\frac{p_1(x_{T-n_1}^{T-1}; \theta_1') \cdot p_2(x_T^{T+n_2-1}; \theta_2)}{p_1(x_{T-n_1}^{T+n_2-1}; \theta_1)}\right)$$

where $n = n_1 + n_2$. Note that difference between $\theta_1'$ and $\theta_1$ means that they are estimated over different times. Since the true parameter sets, $\theta_1$, $\theta_1'$ and $\theta_2$ are unknown, maximum likelihood (ML) approach can be used to come up with their estimates, $\hat{\theta}_1$, $\hat{\theta}_1'$ and $\hat{\theta}_2$ obtained directly from there respective regions: $\{t-n_1, \ldots, t+n_2-1\}$ $\{t-n_1, \ldots, t-1\}$ and $\{t, \ldots, t+n_2-1\}$. When the resulting likelihood, $LR1_{\hat{\theta}_1,\hat{\theta}_1',\hat{\theta}_2}$ surpass some predefined threshold, a change is announced.

Hotelling's $T^2$ Statistic

Hotelling's $T^2$ statistic is a generalization of Student's t statistic that is used in multivariate hypothesis testing. One way to adapt it for the univariate change detection problem is to introduce time delays to the univariate sensor measurement. That is, the raw univariate signal x(t) gets delayed m sample points to generate x(t−m). Similarly, x(t−m) can get delayed another m samples points to generate x(t−2m). In this way, one can generate a pseudo multivariate time series, such as [x(t), x(t−m), x(t−2m)]' to perform Hotelling's $T^2$ calculation as before.

In FIG. 26, we show a univariate time series data where an offset change occurs at the red line. RPT, LRT and a couple of variants of Hotelling's $T^2$ techniques are used individually to detect where the change occurred. All those techniques can detect the changes with reasonable delays although the alarm thresholds at which each technique gets triggered are different. Compared to the RPT and LRT, Hotelling's $T^2$ statistic may not detect change as quickly as them, but its behavior is very consistent when different types of changes are tested. This characteristic of Hotelling's $T^2$ statistic makes it a potential good candidate to be deployed in the real monitoring system.

As described above, the invention leverages Hotelling's $T^2$ statistic technique to estimate the normality of multivariate data. The Hotelling's $T^2$ statistic uses the statistical distance that incorporates the multivariate variance-covariance matrix. Therefore, it detects both mean shift and counter-relationships among the sensed variables.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for advanced condition monitoring of an asset system, the method comprising the steps of:
    segmenting an operating space of an asset system into a plurality of operating regimes;
    using a plurality of auto-associative neural networks (AANNs) to determine an estimated value of an actual value sensed by the at least one sensor in a plurality of operating regimes;
    determining a plurality of residuals based on a difference between the estimated value and the actual value from each of the plurality of auto-associative neural networks;
    using a fuzzy supervisory model blender to generate a weighting factor used in determining an integrated overall residual from the plurality of residuals;
    determining a change of an operating condition of the asset system by analysis of the integrated overall residual; and
    providing an alert if a change of the operation of the asset system has been determined.

2. The method of claim 1, wherein the AANN comprises hidden nodes of the tan-sigmoid (tansig) type.

3. The method of claim 1, wherein the AANN comprises a central bottleneck layer with embedded linear transformation functions.

4. The method of claim 1, wherein the alerting step comprises distributing a message via an information transport medium selected from the group consisting of an electrical cable, power line conduction, an intranet, the Internet, and a wireless transmission.

5. The method of claim 1, wherein the step of determining the change in the operating condition is performed when the asset system is transiting between two of the plurality of operating regimes.

6. The method of claim 1, wherein the alerting step is performed when the asset system is transiting between two of the plurality of operating regimes.

7. The method of claim 1, wherein the step of determining the change in the operation condition is performed when the asset system is operating in one of the plurality of operating regimes.

8. The method of claim 1, wherein the alerting step is performed when the asset system is operating in one of the plurality of operating regimes.

9. The method of claim 1, wherein the fuzzy supervisory model blender implements a global model over the plurality of operating regimes of the asset system.

10. The method of claim 1, wherein the at least one sensor comprises a smart sensor.

11. The method of claim 10, wherein the smart sensor is connected to a smart sensor system.

12. The method of claim 11, wherein the smart sensor system comprises an on-board processing unit for advanced condition monitoring of the asset system.

13. A smart sensor system, comprising:
  a smart sensor for monitoring an operating condition of an asset system, the smart sensor being connected to an input port via a cable; and
  an on-board processing unit for advanced condition monitoring of the asset system using the method of claim 1.

14. The system of claim 13, further comprising a wireless communications unit for wirelessly transmitting signals from the smart sensor system to a peripheral processing device.

15. The system of claim 13, further comprising a display and alarm unit for displaying computational results from the processing unit.

16. The method of claim 1, wherein the integrated overall residual is determined using a weighted average of the plurality of residuals.

* * * * *

UNITED STATES PATENT AND TRADEMARK OFFICE
CERTIFICATE OF CORRECTION

PATENT NO. : 7,756,678 B2
APPLICATION NO. : 12/129632
DATED : July 13, 2010
INVENTOR(S) : Bonissone et al.

It is certified that error appears in the above-identified patent and that said Letters Patent is hereby corrected as shown below:

In Column 6, Line 56, delete "$\Delta t^2 = (x^* - \mu)'$" and insert -- $\Delta t^2 = (x^* - \mu^*)'$ --, therefor.

In Column 8, Line 36, delete "$cont_{a,j} = (t_a/s_a^2) p_{a,j}(x_j - \mu_j)$" and insert -- $cont_{a,j} = (t_a/s_a^2) p_{a,j}(x_j - \mu_j)$ --, therefor.

In Column 17, Line 8, delete "$\{x(i)\}_{i=t-n_1,\ldots,t-1}$" and insert -- $\{x(i)\}_{i=t-n_1,\ldots,t-1}$ --, therefor.

In Column 17, Line 9, delete "$x_2(t)_{i=t,\ldots,t+n_2-1}$" and insert -- $X_2(t) = \{x(i)\}_{i=t,\ldots,t+n_2-1}$ --, therefor.

In Column 37, Line 9, delete "$LR1_{\hat{\theta}_1,\hat{\theta}_1',\hat{\theta}_2}$" and insert -- $LR|_{\hat{\theta}_1,\hat{\theta}_1',\hat{\theta}_2}$ --, therefor.

Signed and Sealed this
Fifth Day of April, 2011

David J. Kappos
*Director of the United States Patent and Trademark Office*